United States Patent [19]

Correa et al.

[11] Patent Number: 5,502,354
[45] Date of Patent: Mar. 26, 1996

[54] DIRECT CURRENT ENERGIZED PULSE GENERATOR UTILIZING AUTOGENOUS CYCLICAL PULSED ABNORMAL GLOW DISCHARGES

[76] Inventors: Paulo N. Correa; Alexandra N. Correa, both of 42 Rockview Gardens, both of Concord, Ontario, Canada, L4K2J6

[21] Appl. No.: 229,931

[22] Filed: Apr. 19, 1994

Related U.S. Application Data

[63] Continuation-in-part of Ser. No. 922,863, Jul. 31, 1992, abandoned.

[51] Int. Cl.[6] ........................................... H01J 7/24
[52] U.S. Cl. ...................... 315/111.01; 315/339; 315/349
[58] Field of Search .......................... 315/111.11, 111.21, 315/111.01, 111.71, 111.91, 56, 61, 63, 339, 349

[56] References Cited

U.S. PATENT DOCUMENTS

| | | | |
|---|---|---|---|
| 3,471,316 | 9/1969 | Manuel | 117/93.3 |
| 3,821,580 | 6/1974 | Alexandrovich et al. | 313/56 |
| 4,733,530 | 3/1988 | Beattie et al. | 315/111.21 X |

*Primary Examiner*—Robert J. Pascal
*Assistant Examiner*—Reginald A. Ratliff
*Attorney, Agent, or Firm*—Ridout & Maybee

[57] ABSTRACT

A cold cathode vacuum discharge tube is used in a circuit for generating pulsed autoelectronic emissions which are particularly intense and frequent in the abnormal glow discharge region, and involve much lower current densities than predicted by the Fowler-Nordheim vacuum arc discharge region law. The discharge tube is characterized by a large electrode area at least of the cathode, and a large interelectrode gap. The electrodes are preferably spaced at least 2 cm apart in a parallel relationship. A probe may be introduced between the electrodes to reduce still further the field required to generate the emissions. In another configuration the probe forms the anode and two plates form cathodes. The circuit is driven from a direct current source of having an impedance sufficient to prevent establishment of a vacuum arc discharge.

18 Claims, 14 Drawing Sheets

DIRECT CURRENT ENERGIZED PULSE GENERATOR UTILIZING AUTOGENOUS CYCLICAL PULSED ABNORMAL GLOW DISCHARGES

REFERENCE TO RELATED APPLICATIONS

This application is a continuation-in-part of International Application PCT/CA93/00311 filed Jul. 30, 1993 and designating the United States of America as a continuation-in-part of U.S. patent application No. 07/922,863 filed Jul. 31, 1992, now abandoned.

FIELD OF THE INVENTION

This invention relates to cold cathode vacuum discharge tubes and in particular to their use in a field emission, cold cathode vacuum tube circuit, hereinafter referred to as a pulse generator, having a large cathode area and large interelectrode gap which, if properly triggered, will generate pulsed auto-electronic emissions in the abnormal glow discharge region.

BACKGROUND OF THE INVENTION

As the current passed through a gas discharge tube is increased beyond the levels at which normal glow discharge takes place, such normal gas discharge being characterized by a negative resistance characteristic leading to decreasing potential between the cathode and anode electrodes of the tube, a region of abnormal glow discharge is entered in which the negative resistance characteristic changes to a positive resistance characteristic leading to increasing potential between the elecytrodes. Typically this increased potential rapidly leads to breakdown into vacuum arc discharge between the electrodes, again characterized by a negative resistance characteristic. Accordingly, gas discharge tubes have been operated in the normal glow discharge or vacuum arc regimes in which stable operation can be achieved by appropriate ballasting of the tube, the former regime being suitable for low current applications and the latter for high current. It is possible to utilize a normal glow discharge tube in a low frequency oscillator circuit by placing capacitance in parallel with the tube and in series with the ballast because such a tube is characterized by a comparatively high striking potential at which discharge is initiated, and a lower but still high extinction potential at which discharge ceases. Operation in such a mode with vacuum arc devices is difficult because, in order to turn off the device effectively, the arc must be extinguished or otherwise interrupted or divested for long enough to disperse the intense ionization formed in its path. On the other hand, the current densities of normal gas discharges are too limited for use in applications requiring relatively large currents.

Devices operating in the vacuum arc regime have other problems, particularly in terms of ensuring adequate electrode life, which have led to gas diodes and triodes (thyratrons) being superseded by semiconductor devices in most applications. A further limitation of such devices is that the great difficulty in turning them off, except by terminating current flow through the device for a finite period, limits their usefulness as control devices to rectification, current turn-on and low frequency alternating current applications.

The only prior art of which we are aware which successfully exploits the abnormal glow discharge regime is the process described in U.S. Pat. No. 3,471,316 (Manuel) issued Oct. 7, 1969, which we understand is commercially utilized in forming organic coatings on metal cans. It relies on the application of externally generated current pulses to force a discharge tube temporarily into the abnormal glow discharge region, the pulses being sufficiently short that no vacuum arc is established. There is no disclosure of any endogenous pulsed abnormal glow discharge, the apparatus is dependent upon an external pulse generator to operate, and its utility is completely different from the present invention because it uses externally generated pulses rather than generating such pulses. U.S. Pat. No. 3,471,316 uses externally generated and limited current pulses to project operation of a discharge tube in a transient manner into the abnormal glow discharge region, thus achieving a higher average current density and accelerating the polymerisation process beyond the rate attainable using a normal glow discharge.

SUMMARY OF THE INVENTION

The problems associated with the operation of vacuum arc devices are typically associated with the establishment of a continuous channel of low resistance ionized plasma between the electrodes of a device operating in this mode, accompanied by intense heating of the electrodes. Such a channel is difficult to interrupt in rapid and predictable manner once established. We have discovered that it is possible to set up a stable endogenous pulsed abnormal glow discharge regime which is characterized by no such continuous channel having been established, and predominantly cold-cathode auto-electronic field emission rather than thermionic emission, these characteristics providing the ability to control and extinguish the discharge readily.

We have found that, by use of a suitable design of a low pressure gas discharge tube, we can sufficiently inhibit transition from the abnormal glow discharge regime into the vacuum arc discharge regime that we can successfully exploit characteristics of the abnormal glow discharge regime to provide a device having valuable and controllable characteristics as a high power, pulse generator when fed from a current source. Such a pulse generator has useful applications in for example motor control and other applications requiring high current pulses. It is a valuable characteristic that the pulse repetition frequency can be varied over a range, the extent of which itself varies according to the physical characteristics of the tube and the environment in which it is operated. According to circumstances, the frequency may range as low as 10 pulses per second or range as high as $10^4$ pulses, these figures being exemplary only and not limitative.

Most prior art vacuum arc discharge has been performed with devices having short interelectrode gap lengths and small electrode areas. Prior art devices require the application of large kilovoltages and amperages, vacuum arc discharges in those devices being initiated by contact and separation of the electrodes. We have established that vacuum devices equipped with cathodes having large surface areas and having large interelectrode distances will support field-emission discharges (either of the pulsed abnormal glow or the vacuum arc type) at low DC voltages (ie. low field strengths) and low applied currents. This indicates that the cold-cathode emissions observed (pulsed abnormal glow discharge and the vacuum arc discharge) in this new class of vacuum pulse generator are a function of parameters heretofore ignored or undiscovered.

The present invention provides a pulse generator and a method of pulse generation as set forth in the appended claims.

DESCRIPTION OF THE DRAWINGS

The invention will be further explained by way of example only and with reference to the following drawings, wherein:

FIG. 20A illustrates the circuit used in the tests that supplied data for FIGS. 5 to 15, and 19.

DESCRIPTION OF THE PREFERRED EMBODIMENTS

Figure 1:
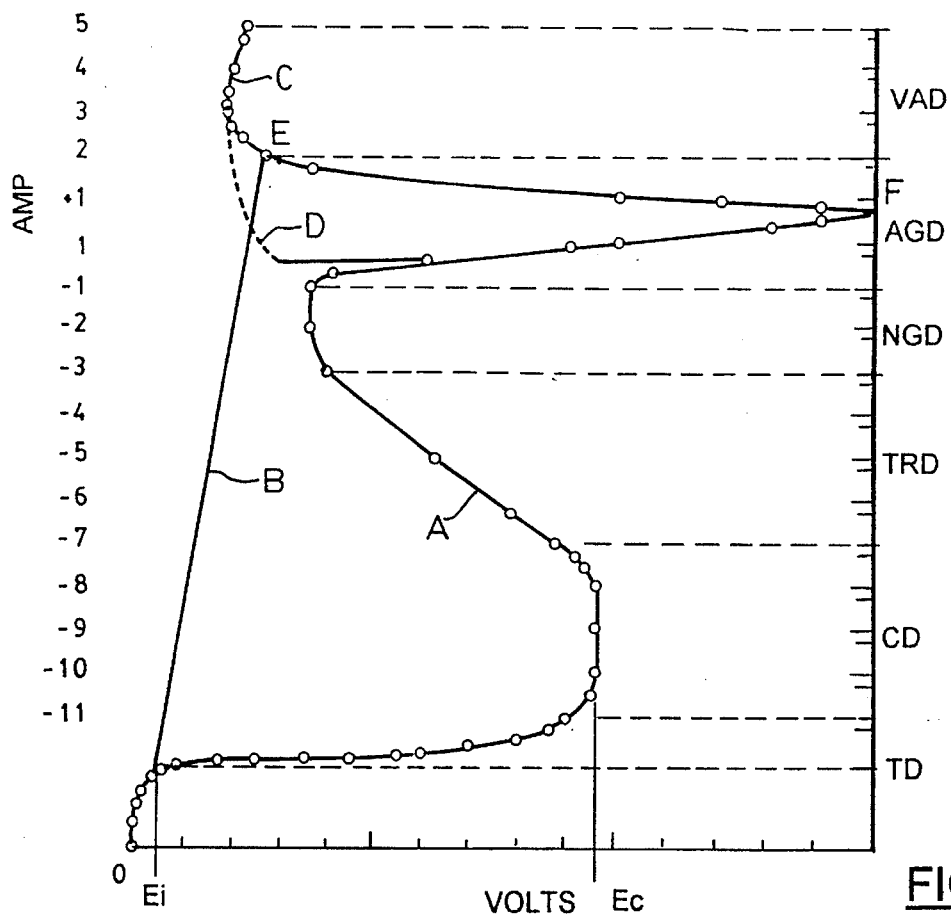
FIG. 1 is a graph illustrating the current to voltage relationship exhibited by a notional vacuum discharge tube.
Figure 2:
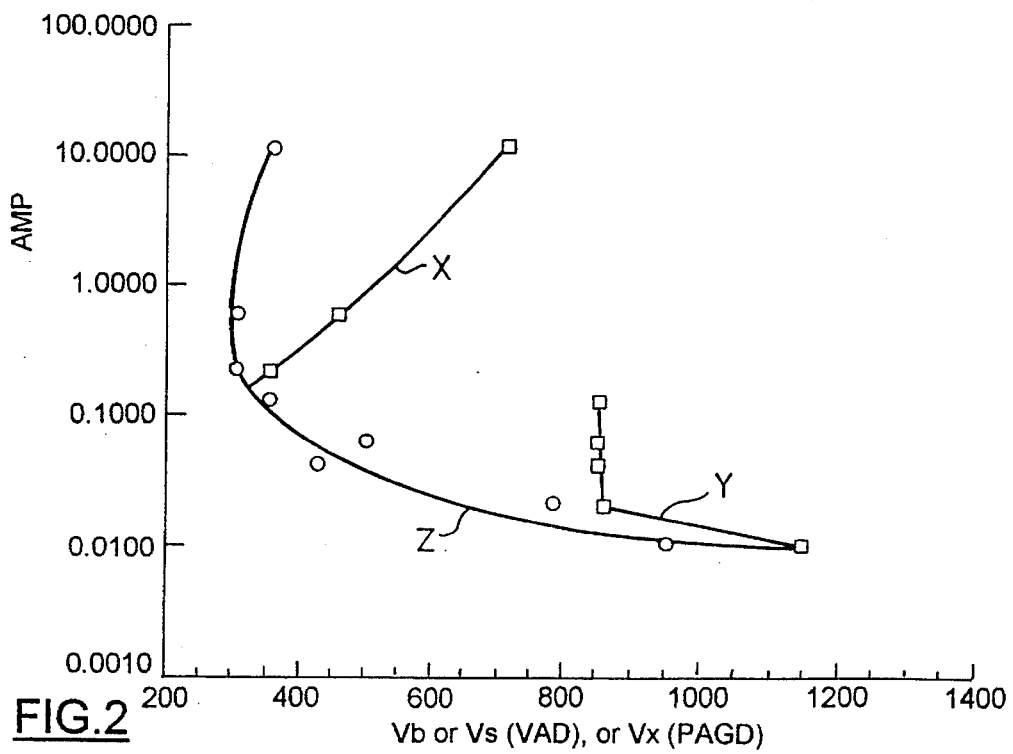
FIG. 2 is a graph illustrating the current to breakdown, extinction (PAGD) and sustaining (VAD) voltages of a particular vacuum discharge tube.

The context of the invention in terms of vacuum discharge phenomena will first be discussed with reference to FIGS. 1 and 2. Referring to FIG. 1, which plots the potential between the principal electrodes of a vacuum discharge tube with increasing current, potential being shown on a linear but arbitrary scale of voltage, and current on a logarithmic scale in amperes, curve A, below its intersection with curve B, represents a typical relationship between current and voltage for cold cathode discharges, including auto-electronic emissions, whilst curve B represents a typical relationship for thermionic glow discharges, including thermionic emissions. The high-current intersection of the two curves at point E represents a transition into the vacuum arc discharge (VAD) region (curve C) with the establishment of a continuous low resistance plasma channel between the electrodes.

It will be noted that curve A exhibits, with increasing current from very low levels, an initially rising voltage or "positive resistance" characteristic, through the Townsend discharge (TD) region, a flat characteristic through the constant discharge (CD) region, a falling voltage or "negative resistance" characteristic through the transitional region discharge (TRD) and normal glow discharge (NGD) regions, to a minimum, before once again rising to a peak of F and then falling to an even lower minimum, equal to the sustaining voltage for a vacuum arc discharge, through the abnormal glow discharge (AGD) region. The rising potential over the first portion of the AGD region is believed occasioned by saturation of the electrodes by the glow discharge, which causes the potential to rise until auto-electronic emission sets in allowing the potential to fall again as the current rises further. In practice, the increasing interelectrode potential-following saturation, and other factors such as electrode heating, leading to thermionic emission, will tend in conventional tubes to result in a premature transition from the AGD into the VAD regime, following a curve similar to curve D shown in FIG. 1.

The present invention relies on the use of gas discharge tubes designed to avoid premature transition from the AGD to the VAD regimes, and capable of being operated in a stable manner in that region of the characteristic curve of FIG. 1 extending between points E and F. FIG. 2, which plots test results for just such a tube, constructed as described below, shows, again on similar coordinates to FIG. 1 (except that the potential units are defined), the extinction or sustaining potentials of the tube (the same information as plotted in FIG. 1), together with the breakdown potential (i.e. the potential required to initiate the autoelectronic discharge). It will be noted that the breakdown curve shows two discontinuous portions X and Y, corresponding to the vacuum arc and abnormal glow discharge regimes respectively. The intersection of curve X, and curve Z representing the sustaining or extinction potential is illustrative of the difficulties inherent in extinguishing a vacuum arc discharge, since a decrease in current is accompanied by a decrease in breakdown voltage until it equals the VAD sustaining voltage which does not vary greatly in this region. On the other hand, the combination of a fairly high and constant breakdown voltage (curve Y) combined with an extinction potential which rises with decreasing current in the region E–F (see FIG. 1) of the pulsed abnormal glow discharge regime means that the pulsed abnormal glow discharge will be extinguished if the current source during the tube operation ceases to be able to sustain the increasing current required to maintain the discharge as the potential between its electrodes drops, at some current below the intersection of curves X and Z.

If the effective internal resistance of the source is above some critical level, then as the current through the tube rises, the proportion of the source potential developed across the tube will fall until it intersects the curve Z at a current below the intersection with curve X, at which point the abnormal glow discharge will self extinguish, and the current flow through the tube will drop abruptly until the current through the tube combined with the potential between its electrodes again intersects the curve A in FIG. 1. This permits reestablishment of a rising current through the tube traversing the abnormal glow discharge region as the potential across the tube rises to the peak F and then again falls to a point short of E. Accordingly, under these circumstances, a pulsed abnormal glow discharge will be exhibited, accompanied by high amplitude current pulses through the tube. It should be understood that the curves of FIG. 1 are indicative of the static behaviour of a nominal discharge tube under particular current and voltage conditions, and are not fully indicative of the behaviour of the tube under dynamic conditions in which tube current and inter-electrode potential vary with time, nor with changes of the many other factors which may influence tube behaviour. In particular, the plasma effects generated in various phases of tube operation require finite time to form, reform or dissipate as the case may be, and in the case presently under consideration this time factor, combined with time constants of the external circuit in which the tube is placed, are determinative of the pulse frequency of the discharge.

The definition of any regime of electrical discharge in a vacuum is usually presented as dependent upon the major operational parameter being considered, i.e. upon the variation of direct current passing between the primary electrodes. For a given optimal vacuum (which must necessarily be less than perfect) all gas electrical discharge regimes can be presented as dependent upon this parameter. FIG. 1 is such a presentation and the peak that characterizes the abnormal discharge region means that within this region, as the applied current is increased linearly, the resistance of the vacuous medium in the tube first increases with increasing current, only to subsequently decrease, still with increasing applied current, down to the minimum resistance value corresponding to the sustaining potential of a "vacuum" arc (which is somewhat above the ionization potential of the gas, or in fact of the metal vapour, in the enclosure). As the transition from a normal glow discharge into a "vacuum" arc discharge is made either directly (in thermionic devices) or indirectly, in cold-cathode conditions, via an abnormal glow discharge that may be more or less precipitous, it is only in the ideal diode and the ideal vacuum that both linear functions (corresponding to the regimes that have a sustaining potential) and nonlinear functions (corresponding to the transition regions, such as the TRD and the AGD) appear to depend exclusively upon the input current. In fact, many factors affect the AGD, foremost amongst them, pressure, plate distance and plate area. Hence the peak in the curve of FIG. 1 is an idealized view of events.

Experimental observations show that auto-electronic emissions characteristic of the pulsed abnormal gas discharge (PAGD) regime emerge from the NGD, as the current is increased beyond the point when the cathode glow has reached plate saturation (if the current is not too low and the plate area not too large).

The same effect occurs when the pressure is reduced and the current is kept constant at a suitable level (neither too high nor too low, exact figures depending on other factors such as gap distance and plate area, etc.).

If the current is increased further, in either case, the PAGD regime fully emerges (in other words, in pumpdown tests, the applied current also has to be sufficient). In this regime the plate is not so much saturated with a negative glow (which remains, but is attenuated), as it exhibits local concentrations of the plasma that arise in a given area of the cathode as a function of the auto-electronic emission mechanism. If the applied current is increased in steps, a stage is reached at which the extinction potential of the PAGD falls until it meets the minimum potential of an arc discharge, as demonstrated in FIG. 2. With reference to FIG. 1, this means that the current-dependent variation of the PAGD in these devices passes from a high to a low extinction potential or from a high to a low electrical resistivity of the medium, and is thus localized on the descending slope of the peak in FIG. 1. Expressed in terms of resistance characteristics, the regime of the pulsed abnormal glow discharge spans, as a function of applied current, a subregion in which a positive resistance characteristic changes into a leading negative resistance characteristic. The pulsed regime of the AGD is only sustainable when the intensity of the applied current is greater than that needed to rapidly saturate the plates (but not so great as to set up a VAD), the result being development of auto-electronic emission with its associated inverted cone-like discharge and a residual, faint glow of the entire cathode (rather than a saturated glow discharge).

Each PAGD cycle begins as a singular emission and performs a cycle of functions whose electrical characteristics vary accordingly with time. During a charging process (which eventually leads to emission), the plate potential rises to a maximum at F (see FIG. 1), while being limited by the maximum virtual value of the applied current. Any substantial increase in the applied current is blocked by the insulating properties of the intervening medium (as if a very large resistance characterized the device); in the discharge process, beginning with the initiation of auto-electronic emission at F, conditions for conduction across the (operational) vacuum are established and, as a consequence, the resistance characteristic of the device becomes increasingly negative until the extinction potential is reached, at which point the glow discharge ceases. This endogenous on/off behaviour is exactly what characterizes the PAGD cycle.

Two boundary conditions arise. In the first case, the available current is not quite enough to sustain the PAGD. In this instance, full escape from the NGD regime and the characteristics associated with its sustaining potential will not occur, while any heating of the cathode will eventually lead to the establishment of a semi-thermionic cathode glow. In the second instance, there is a risk of degeneration into a thermionic NGD or a VAD if the available current is too high or sustained too long. This degeneration will set in during the second phase of the PAGD unit cycle, and may lower the resistance of the device to the point of constant conduction of current across the vacuum; the result is that the auto-electronic emission is not quenched, as spontaneously happens in the PAGD. Thereafter, extinction of the resulting VAD, which may be promoted by a variety of factors is an unpredictable event; if the current is available, the arc will burn for as long as there is energy supplied and as long as there is cathode material available to consume. A VAD in no way resembles a regular, cyclic oscillator, which is the outstanding aspect of the PAGD. Whilst an arc discharge is, like the PAGD, an auto-electronic emission phenomenon characterized by intermittences (the apparent constancy of an arc is the result of the very high frequency of these intermittences), such an arc does not exhibit the regular or quasi-regular cyclical nature of the PAGD, nor its inherent current limiting characteristics.

In order that a stable pulsed abnormal glow discharge (PAGD) as discussed above may be obtained, the discharge to be utilized must be capable of repeated excursions into the region E to F of FIG. 1. This entails that the tube be constructed so that, as the tube operates and the current through it rises, the potential across the tube can reach the peak F in FIG. 1 and beyond, without the pulsed abnormal glow discharge degenerating into a vacuum arc discharge. This will be influenced, among other factors, by the extent of thermionic emission from the cathode which will itself be influenced by resistive heating of the electrodes and their work function, as well as by their separation and configuration, and the nature and pressure of gas within the tube, as well as the presence of auxiliary electrodes or probes. The influence of these various factors is extensively exemplified below. Whilst the present invention is exemplified with reference to its implementation using certain exemplary tubes, it should be understood that the invention may be implemented utilizing any tube capable of sustaining a stable PAGD discharge without rapid self destruction whether or not of a structure specifically disclosed. Thus we have been able to sustain PAGD utilising tubes of diverse configuration; for example high voltage thermionic diodes with the anode connected as cathode, the cathode as anode, and the heater unused. Even fluorescent lighting tubes can be operated briefly in the PAGD regime although they are unsuitable for practical use and fail very rapidly since their electrodes cannot withstand the current densities involved. Even tubes having electrode structures that can withstand the currents invoved will not be suitable if they become heated to a point at which thermionic emission promotes dgeneration of a PAGD into a VAD.

Figure 3:
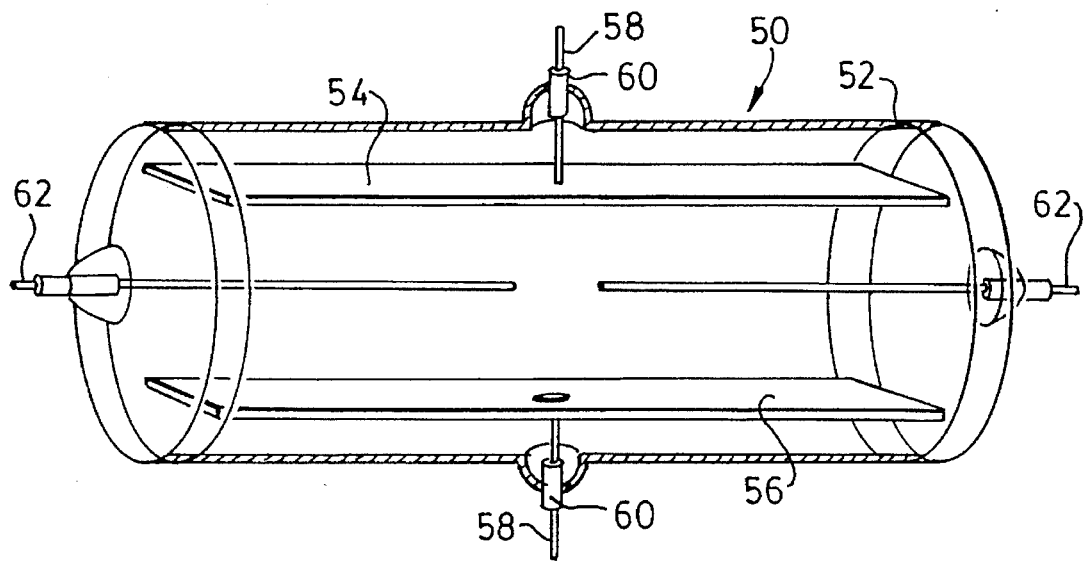
FIG. 3 illustrates a discharge tube for a pulse generator having a glass housing and tetrode geometry.
Figure 4:
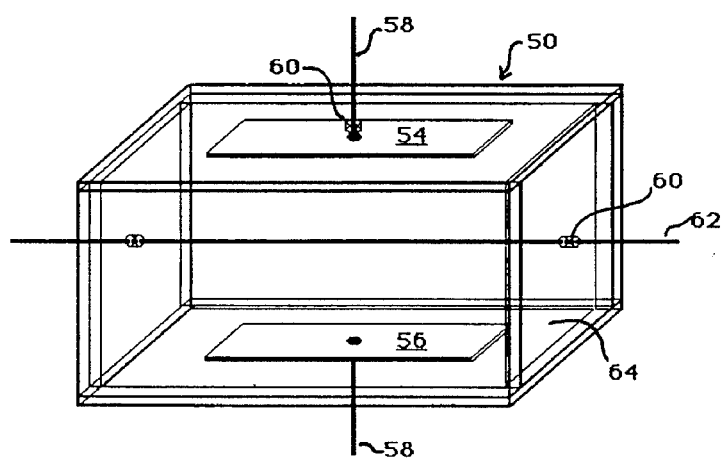
FIG. 4 illustrates a tube having a polymer housing and a triode geometry.
Figure 5A:
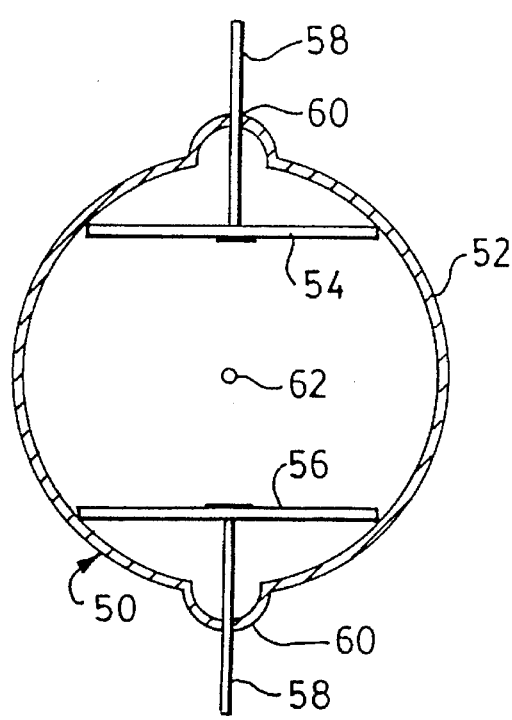
FIG. 5 illustrates central cross sections of two glass housings (FIGS. 5A and 5B) and a polymer housing (FIG. 5C)
Figure 5B:
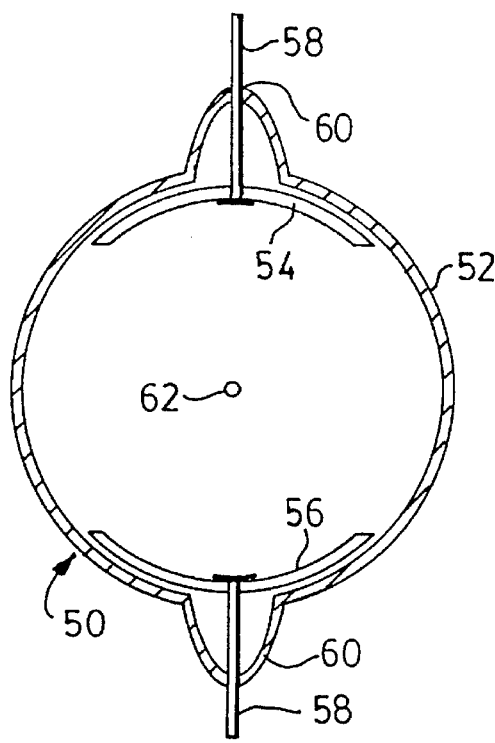
Figure 5C:
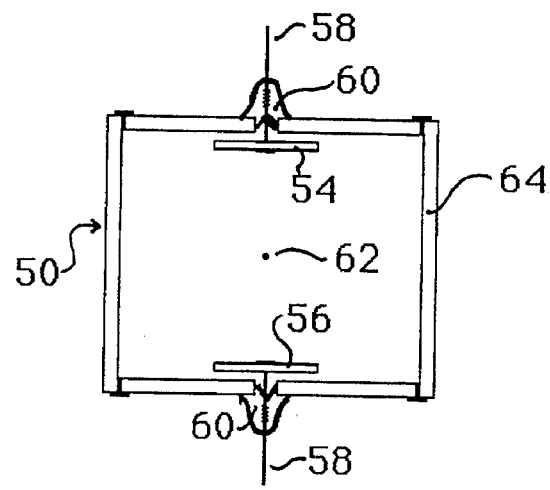

FIGS. 3 through 5 of the drawings illustrate the construction geometry of presently preferred embodiments of tubes for use in pulse generators in accordance with the invention. The discharge tubes are assembled using accepted techniques which are well known to those skilled in the art of vacuum tube technology.

FIG. 3 shows a discharge tube, generally referred to by reference 50, having a cylindrical housing 52 which is preferably a glass material. Depending on the interelectrode spacing of the discharge tube, which in accordance with the invention may range from about 2 cm to about 20 cm or more, the glass housing 52 is preferably Pyrex (trademark), or #7740 borosilicate (Corning, N.Y.). Such cylindrical housings 52 are commonly available in diameters of about 6 to about 11 cm and a variable thickness of about 0.2 to about 0.3 cm. Other borosilicate glass, quartz glass or ceramic housings can be employed as suitable alternatives to Pyrex glass and in sizes outside these commonly available ranges.

The discharge tube 50 further includes two parallel, spaced-apart electrodes comprising a cathode 54 and an anode 56, hereinafter often collectively referred to as "plates" for brevity and convenience. As noted above, the anode and cathode in discharge tubes according to the invention are spaced 2 to 20 cm or more apart. The cathode 54 and the anode 56 may be either flat or curved and are preferably made of 0.5 to 2.0 mm thick aluminum, nickel or nickel alloy, zinc or iron. The thickness of the cathode 54 and the anode 56 is not critical and any thickness within a reasonable range apparent to those skilled in the art may be used. The surface areas of the cathode 54 and the anode 56 are preferably quite large in comparison to the surface area of an anode/cathode in prior art vacuum tube devices. Surface areas which range from 16 to 256 $cm^2$ have been tested, as described in the examples hereinafter. Although the scope of the invention is not believed to be limited by this range of surface area of values, it was generally observed that the larger the surface area of the anode/cathode tested, the more readily the discharge tube 50 elicited PAGD discharges providing other conditions such as plate material, vacuum, residual gas fill, voltage and current remained constant.

A preferred material for the cathode 54 and the anode 56 is aluminum. Two specific types of aluminum are preferred: namely, H34 rolled aluminum available from the Alcan Company and Alzak (trademark) aluminum available from the Alcoa company. Other types of aluminum are assumed to constitute suitable material for cathode 54 and anode 56. Aluminum is a preferred material because of its low work function for field emission as well as for its other qualities such as relative freedom from sputtering, except when subjected to vacuum arc discharges, and its electrical conductivity. In all instances, the aluminum used for cathode 54 and anode 56 were degreased and rinsed in accordance with published methods familiar to those skilled in the art.

Each of the cathode 54 and anode 56 are suspended within housing 52 by a support member 58 which passes through hermetic seal 60 on opposite sides of the housing 52. The support members 58 are preferably rigid rods of substantially pure tungsten in a diameter of $\frac{1}{16}$th to $\frac{3}{32}$nds of an inch, or any suitable diameter. The material of choice is round finished PureTung (trademark) available from Union Carbide.

The discharge tube 50 also includes at least one axial probe 62 and the discharge tube 50 shown in FIG. 3 has a tetrode geometry with two spaced-apart axial probes 62. Substantially pure tungsten rod is also the preferred material for constructing the axial probe(s). All tungsten rods used in assembling discharge tubes in accordance with the invention were repeatedly cleaned with sodium nitrate and fused with a beaded sleeve of uranium glass #3320 available from the Corning Company or Nonex (trademark) glass #7720. These glasses are graded seals designed for high vacuum tungsten/Pyrex junctions. Before the metal components of the discharge tube 50 are introduced into the glass housing 52, the housing is annealed at a temperature of 565° C. After the discharge tube was assembled, it was connected by a glass constriction tube to the glass manifold of a vacuum system (not illustrated).

FIG. 4 illustrates a further geometry for a discharge tube 50 in accordance with the invention. The discharge tube includes a parallelepiped shaped housing 64 which is assembled using a suitable plastic polymer sheet. Polymer housings are preferably made from polycarbonate resin, preferably ultraviolet resistant. The joints of the rectangular panels are sealed for example with a low vapor pressure resin Torr Seal (trademark) available from the Varian Corporation which is applied along the mating edges to glue the panels, or another adhesive system suitable for withstanding the implosive forces of very high vacuum. For very large housings 64 the walls are also preferably screwed together at spaced-apart intervals. Non-metallic internal braces can also be used to reinforce very large housings 64. The polycarbonate housings are cleaned as per manufacturer's instructions and all metal to polymer support interfaces, such as the hermetic seals 60 where electrodes 58 and probe(s) 62 pass through a side wall of the parallelepiped shaped housing 64, are preferably epoxy resin joints made with Torr Seal resin. The single axial probe 62 is made of substantially pure tungsten rod.

FIG. 5 shows transverse cross-sections of exemplary constructions of discharge tubes in accordance with the invention. FIG. 5A illustrates a cylindrical housing 52 with a flat plate anode 56 and cathode 54. As shown in FIG. 5B, the anode 56 and the cathode 54 may be elongated, transversely curved sections which are substantially semi-cylindrical in shape. This anode/cathode geometry is actually preferred for cylindrical housings. The curved electrodes may be made from laser quality reflective aluminum foil about 200 microns in thickness. Such electrodes have a current tolerance of approximately 100 mA of direct current in the PAGD regime and are easily destroyed by current induced disruptive slippage into arc discharge. Curved electrodes of press-formed aluminum plate are therefore preferred over curved electrodes made from aluminum foil.

Processing of the Vacua

An oil diffusion/rotary pump combination (EO2/E2M2, Edwards High-vacuum, using Silicone 705 diffusion oil), equipped with thermocouple and Penning gauges (for rotary and diffusion vacua, respectively), was used to pumpdown a large bore glass-metal vacuum system equipped with a baffle valve, desiccating and cold traps, down to $10^{-7}$ Torr (=mm Hg) pressures. At $10^{-3}$ to $10^{-4}$ Torr, the rotary pump was bypassed, and 500 mm Hg of UHP (ultra high purity, spectroscopic grade 99.9996% pure) argon was admitted into the system. The system was then evacuated back to $10^{-4}$ Torr and the operation was repeated three more times except the third time a tension of 25 kV (10 mA) DC was applied to the plate electrodes when the pressure reached $^-10$ mm Hg. Cold cathode normal glow discharge (NGD) currents of 10 mA were used to liberate all adsorbed gases remaining in the electrodes and the inner face of the housing (52,64), while the pressure fell to $10^{-4}$ Torr. Flame heating of the housing 52 was also performed throughout and most intensely at the constriction joint. Two external, water-cooled copper RF coils were then applied at each end of the housing 52 and operated at 450 KHz, at calibrated temperatures of 400° C. to further facilitate the liberation of occluded gases, excessive heating being strictly avoided. Alternatively to the RF induction heater, an electrical tape (eg. Briskheat (trademark)) controlled at a temperature of 400° C. can be applied to the glass housing. After about 30 minutes, the RF induction heater was turned off and a 100 Kc 30 kV Tesla coil was applied unipolarly to the probe(s). Then, once more, 500 mm Hg of UHP argon were admitted into the system and the cycle of evacuation, heating and bombardment was repeated, except this time the diffusion pump was connected to the system and the electron bombardment was carried out to pressures of $5*10^{-5}$ Torr. At this point, and with the 25 kV DC still on, weak x-ray production occurred at the plate edges and this could be detected with a sensitive, mica-window Geiger-Muller tube counter set at a 5 cm distance from the discharge tube housing 52, 64. This x-ray production can be sustained indefinitely at these kilovoltages and at a pressure of $10^{-6}$ Torr, without degenerating into a glow discharge (ie. without evolution of gas and a rise in pressure). The tube was then considered to be practically clean ('hard' or x-ray vacuum). It was then pumped down to the $10^{-7}$ Torr range until all discharge ceased and maintained at that vacuum for a further 8 hrs. Seal-off at the constriction joint involved slowly heating the joint such that the pressure never rose above $10^{-6}$ Torr. The end-processed discharge tubes 50 were all closed at different values of 'hard' vacua ($10^{-6}$ Torr or higher vacua). For discharge tubes 50 closed at lower vacua (medium vacuum), ie. at pressures higher than $10^{-6}$ Torr but lower than $10^{-4}$ Torr, the desired pressure was achieved by reintroducing controlled amounts of UHP argon and adjusting with the diffusion pump on, after thorough processing, as described above. For discharge tubes 50 closed at low vacuum to medium vacuum (5 to $10^{-4}$ Torr), the diffusion pump did not need to be turned on and the procedures of heating and electron bombardment were followed at the maximal rotary pump vacuum of $^-7.5$ to $5*10^{-4}$ Torr. The desired final pressure was achieved by an identically controlled re-admission of small quantities of UHP argon.

Discharge tubes 50 built with polymer-type housings 64 cannot withstand the heating step during pumpdown (nor do they require annealing). Accordingly, only the electron bombardment procedure was performed while processing the vacuum for those discharge tubes, and for suitably longer periods (up to 1 hour each cycle). Pumpdown times were also extended under those conditions.

During and after vacuum processing, the vacua were constantly tested at the electrodes and at the probes with a unipolar 30 kV Tesla coil, when all other electrical apparatus were off. At pressures near $10^{-4}$ Torr only a faint local bluish fluorescence could be detected, and at pressures greater than $5*10^{-5}$ Torr no discharge could be observed (so-called 'black' vacuum).

The following examples of tests conducted with pulse generators incorporating discharge tubes 50 illustrate the character and performance of such pulse generators. The disharge tubes utilised are listed in Table 1.

Figure 20A:
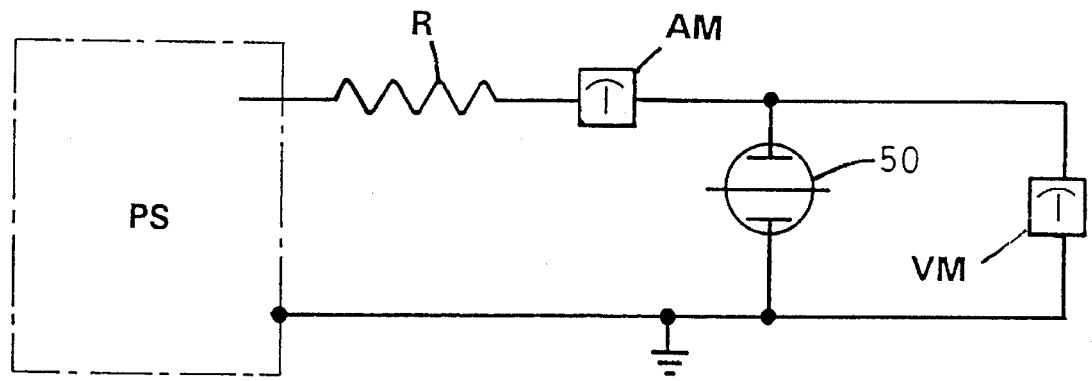
FIGS. 20A and B show two typical wiring diagrams of pulse generators in accordance with the invention.
Figure 20B:
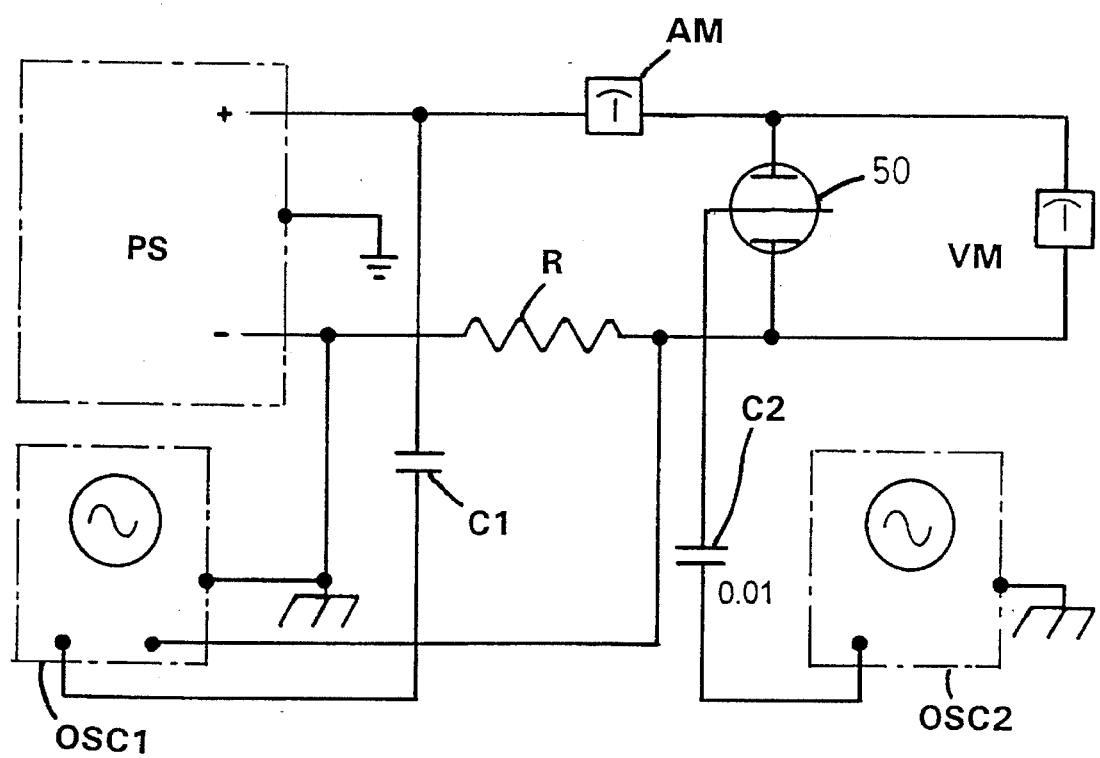
FIG. 20B illustrates the circuit used for test results illustrated in FIGS. 16 to 18.

For test purposes, the tubes were utilised in test circuits as shown in FIGS. 20A and 20B. The circuit of FIG. 20A was used for most tests, the additional features of FIG. 20B being used only for the tests described with reference to FIGS. 16–18.

In FIG. 20A, a low impedance DC power supply PS had terminals connected to plate electrodes of a discharge tube 50, in the case of a first terminal through a ballast resistor R, of a resistance which is selected according to the test being performed, and an ammeter capable of measuring DC current or RMS AC current. The other terminal was grounded. A DC voltmeter was connected across the tube 50, and a probe electrode of the tube 50 was left unconnected.

TABLE 1

List of all the devices utilized

| # | Area, cm$^2$ | Plate material | d, cm | Vacuum in Torr | FIG.S |
|---|---|---|---|---|---|
| 1 | 128 | H34 Al. | 5 | $10^{-6}$ | 5, 6, 7, 8, 9, 18, 19 |
| 2 | 128 | Alzak | 5 | $10^{-6}$ | 8 |
| 3 | 16 | H34 Al. | 5.5 | Variable | 11, 12, 14 |
| 4 | 64 | H34 Al. | 5.5 | Variable | 11, 12 |
| 5 | 128 | H34 Al. | 5.5 | Variable | 11, 12, 13 |
| 6 | 128 | H34 Al. | 5.5 | Variable | 11 |
| 7 | 16 | H34 Al. | 5.0 | $2*10^{-6}$ | 16, 17 |
| 8 | 16 | H34 Al. | 5.0 | $2*10^{-6}$ | 16 |
| 9 | 64 | H34 Al. | 5.0 | $2*10^{-6}$ | 16, 17 |
| 10 | 64 | H34 Al. | 5.0 | $2*10^{-6}$ | 16 |
| 11 | 128 | H34 Al. | 5.0 | $2*10^{-6}$ | 16, 17 |
| 12 | 128 | H34 Al. | 5.0 | $2*10^{-6}$ | 16 |
| 13 | 256 | H34 Al. | 5.0 | $2*10^{-6}$ | 16, 17 |
| 14 | 64 | Alzak | 5.0 | $2*10^{-6}$ | 17 |
| 15 | 77 | Alzak | 5.0 | $2*10^{-6}$ | 17 |
| 16 | 128 | Alzak | 5.0 | $2*10^{-6}$ | 17 |

TABLE 1-continued

List of all the devices utilized

| # | Area, cm² | Plate material | d, cm | Vacuum in Torr | FIG.S |
|---|---|---|---|---|---|
| 17 | 64 | H34 | 3.6 | $2 * 10^{-6}$ | (Table 5) |

In FIG. 20B, the first terminal was grounded so that a current waveform developed across the ballast resistor R could be monitored by an oscilloscope OSC1, voltage variations across the tube being monitored by the oscilloscope OSC1 through a capacitor C1. The potential at the probe electrode was monitored through a further capacitor C2 by a further oscilloscope OSC2.

Figure 21A:
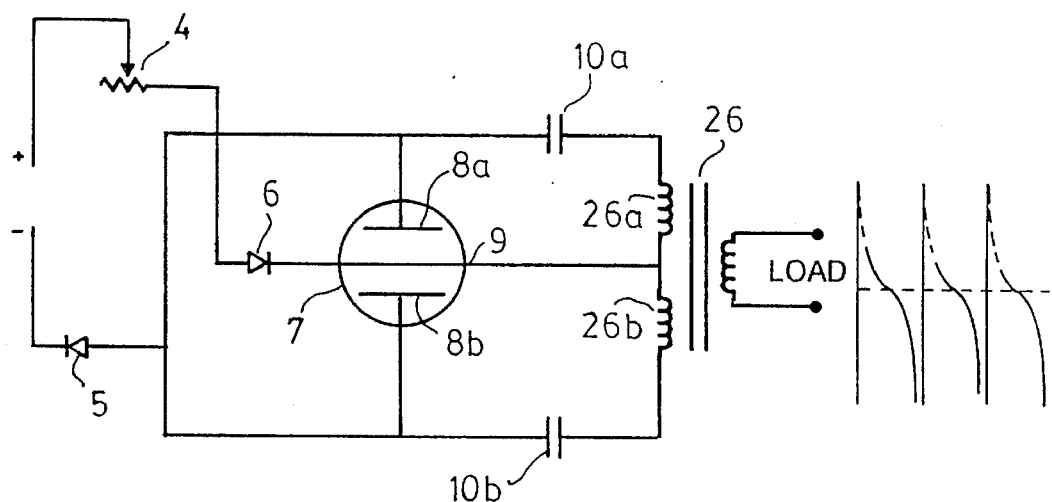
FIGS. 21A and 21B show alternative configurations in which the tubes described can be incorporated into a pulse generator.

It should be understood that the above circuits are designed for the purpose of testing the invention, and in many practical applications of the pulse generator of the invention, it will be necessary to couple the plate electrodes to a further circuit arm driven by the pulse generator, the coupling typically utilising capacitors and/or diodes. The real and imaginary components of any load applied through such a coupling will influence the operating conditions of the pulse generator, and it may also be necessary to include diodes in series with the connections to the power supply as shown in FIGS. 21A & B in order to help isolate the load from the supply, thus turning the pulse generator into a double ported device.

EXAMPLE 1

Volt-ampere Characteristics of a Pulse Generator

The tests described in this example were conducted with a discharge tube 50 (device #1) constructed with H34 aluminum flat plates (128 cm² area) set 5 cm apart, and equidistantly from a continuous axial probe 62 in a vacuum which measured $10^{-6}$ Torr at time of seal off. FIG. 2 shows that under conditions of a positive, constant DC voltage applied to the anode 56 of this device, the volt-ampere curve for both breakdown potential (Vb, shown as open squares) and for the minimum discharge potentials (Vs, or VAD sustaining potential and Vx, or extinction PAGD potential, both shown as closed circles) disclose two regions or regimes in the operation of this device, a region of pulsed AGD which spanned from about 10 mA to about 150 mA RMS (with an applied maximum of 15 mA DC average), and a region of VAD at RMS current values greater than 250 mA. PAGD current data was derived from peak RMS values and VAD RMS current data was obtained at steady-state. Within the range of the pulsed AGD, the Vb values were high and plateaued at about 850 volts; Vb values for the VAD regime were generally lower than those of the PAGD and could be raised by an increase in available current.

Figure 6:
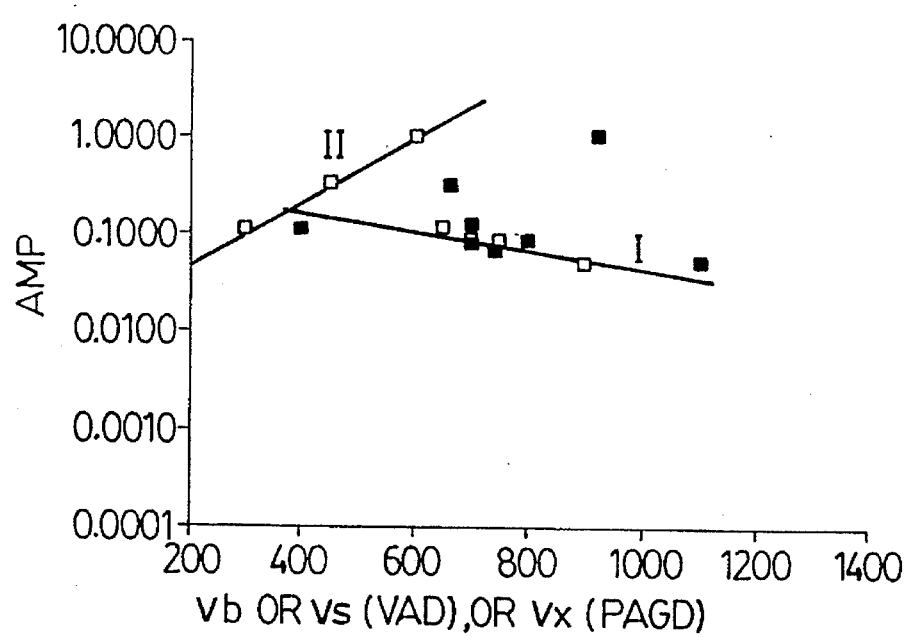
FIG. 6 illustrates volt-ampere linear characteristics of two distinct cold-cathode discharge regimes, PAGD and VAD, in the same tube providing the curves of FIG. 2.

As shown in FIG. 6, a PAGD regime could also be equally identified when the supplied DC voltage was negative and applied to the same cathode plate 54 (see FIG. 3), for both PAGD and VAD, Vb and Vx values (closed and open squares, respectively) at comparable transduced pulse RMS currents. Utilizing a 10-fold higher direct current power supply, also earth-grounded at the centertap but having a parallel supply capacitance of 55 mfd and a slow voltage recovery rate (ie. less than 200 V/sec), the same discharge tube 50 (device #1) yielded 10× higher peak PAGD RMS currents (2 A vs. 200 mA) than were obtained under the same conditions and with the same power supply by a positive applied voltage of equal magnitude. These findings suggest that, at high applied direct currents, there is a strong asymmetric response of the discharge tubes 50 (larger PAGD RMS current values with cathodic tension than with comparable anodic tension) with respect to the sign of the plate polarization in reference to earth-ground.

Figure 7:
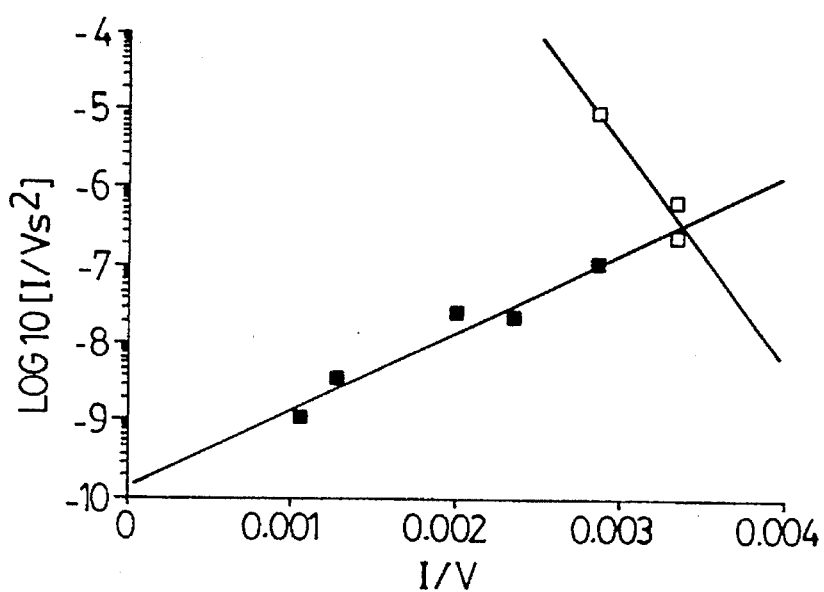
FIG. 7 illustrates a Fowler-Nordheim plot of the Vx or Vs values for the PAGD and VAD regimes, respectively, again in the same tube.

It is also apparent that the field emission responsible for the PAGD regime does not obey the Fowler-Nordheim VAD region law (see FIG. 7): whereas the VAD graph has the expected negative slope, the slope of the PAGD graph is positive, contrary to predictions by the Fowler-Nordheim VAD region law. This constitutes strong evidence for the existence of auto-electronic emission discharges that occur at much lower input currents than predicted by the Fowler-Nordheim field-emission theory.

EXAMPLE 2

Pulse Count Rates in the PAGD Region

Two pulse count studies were done: a first at low applied direct currents (<1.5 mA) and a second at mid to high applied direct currents (1.5 mA to 200 mA). Peak pulse RMS currents during the second study were as high as 2 A. Two tubes were used, each having 128 cm² rigid, flat plate anode/cathode set 5 cm apart, a continual axial probe and a $10^{-6}$ Torr vacua at time of manufacture, but having different plate materials; namely H34 aluminum (device #1) and Alzak (trademark) aluminum (device #2) respectively; the applied direct currents were increased with the voltage from 0.1 to 1.0 mA, and all measurements were taken with a 1 Mohm ballast resistor.

Figure 8:
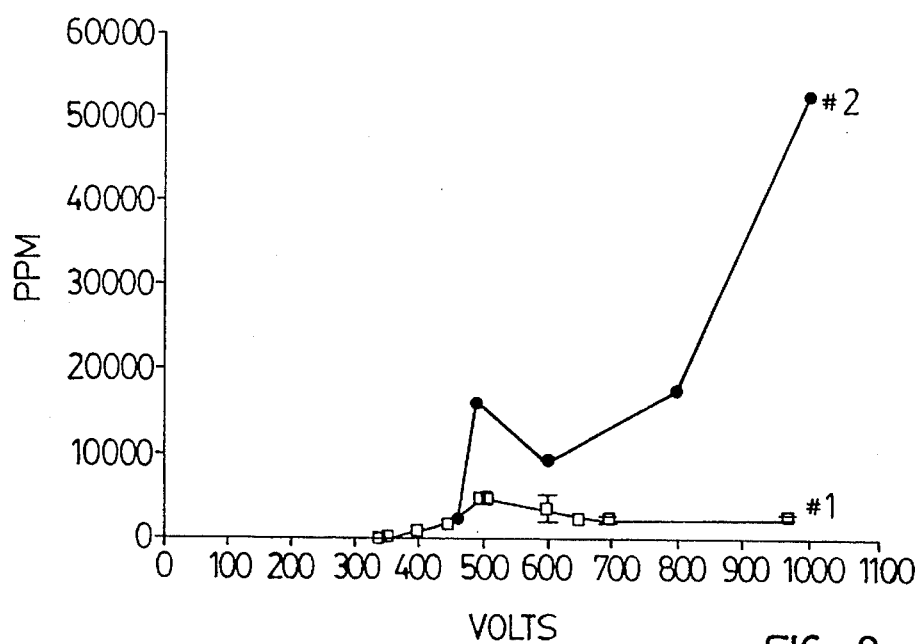
FIG. 8 illustrates the pulse per minute rate variation observed as a function of low current, anode-supplied constant DC voltage for two pulse generators

At low currents (see FIG. 8), using the discharge tube 50 (device #1) assembled with H34 aluminum plates and ballasted with a 1 Mohm resistor and a lower pulse amplitude detection cut-off at less than 25 V, the pulse per minute counts at the axial probe were observed to increase as the anode-supplied voltage (and the current, not illustrated), was incremented from 300 V to 500 V. At higher voltages, the pulse count plateaued at a somewhat depressed level (FIG. 8, open squares). Conversely, utilizing a discharge tube (device #2) assembled with Alzak plates in an identical vacuum at seal off ($10^{-6}$ Torr), the pulse counts increased with applied voltage up to a maximum voltage applied, the maximum pulse count being about 9 times higher than observed with device #1 (FIG. 8, closed circles). Reducing the ballast resistance increased the pulse rate of device #1 to a maximum of 1000 pps or 60,000 PPM with a 0.125 ohm resistor, and increased the pulse rate of device #2 to 4000 pps or 240,000 PPM. Analysis of the pulse signals with an oscilloscope showed that, in both instances, the observed CPM (counts per minute) values at the axial probe 62 effectively corresponded (about 1:1) to the PPM (pulses per minute) values at the cathode 54, under these conditions, for both devices #1 and #2.

Figure 9:
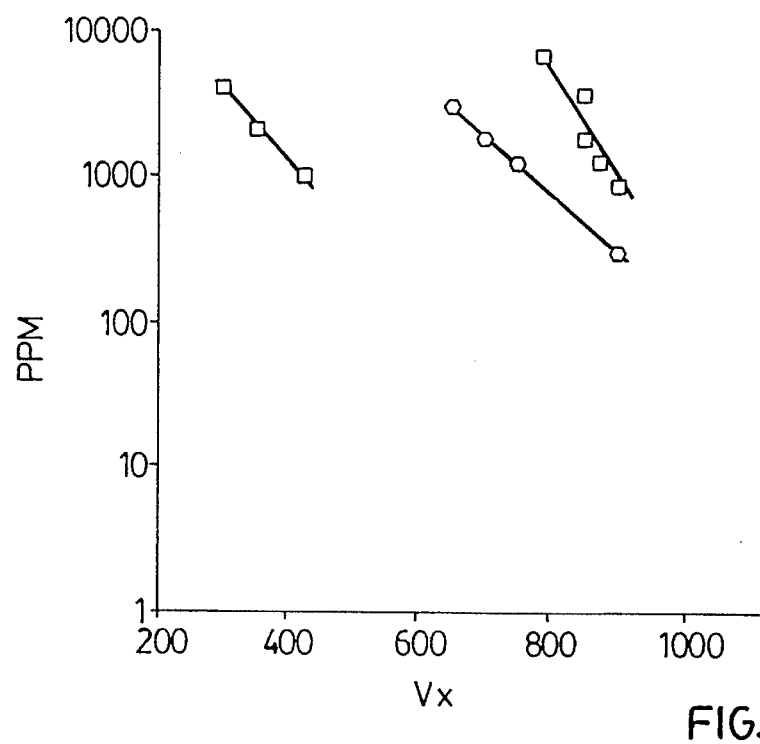
FIG. 9 illustrates the continuous variation of the pulse per minute rate as a function of anode-supplied or cathode-supplied DC voltage.

At currents higher than 1.0 mA, when the PAGD regime is fully active, the inverse phenomenon was observed: ie. the pulse rates increased with a decrease in the value of the extinction voltage (Vx) (see FIG. 9). FIG. 9 illustrates the continuous variation of the pulse per minute rate as a function of anode-supplied (open squares) or cathode-supplied (open circles) DC voltage, at applied currents that varied from 1 to 200 mA (the higher current sequence for the anode voltage is on the left); the anode voltage curve shown on the right side of the figure was obtained using an intermediate current supply; the two other slopes were obtained using a high current supply; capacitance values for both high and intermediate current supplies were respectively, 50 and 1 mfd, both power supplies being earth-grounded; the discharge tube (device #1) had 128 cm² H34 aluminum plates set 5 cm apart and enclosed a vacuum measured at $10^{-6}$ Torr at time of seal off.

Figure 10:
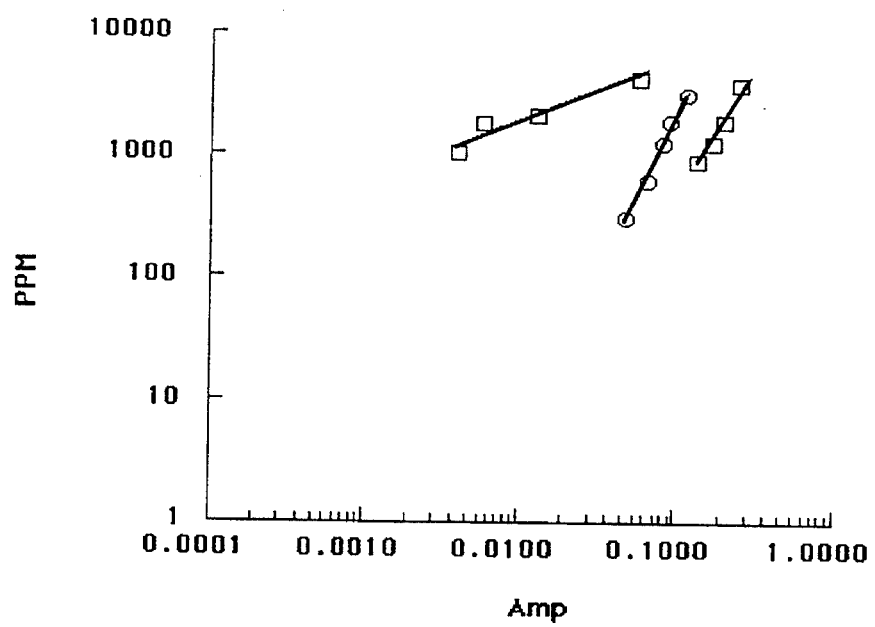
FIG. 10 illustrates an increase in the pulse frequency per minute as a function of the peak pulse RMS current.

Pulse rates also increased proportionally to the transduced pulse RMS current (see FIG. 10). FIG. 10 illustrates an increase in the pulse frequency per minute as a function of the peak pulse RMS current, at applied currents from 1 to 200 mA; corresponding voltages are shown in FIG. 9 (not for all points) and the higher current, anode-supplied curve corresponds to the lower voltage curve in FIG. 9, all conditions being as described for FIG. 9. The pulse rate increase was observed for both positive and negative polarizations (squares and circles, respectively, in both FIGS. 9 and 10) of the 'vacuum', with discharge tube 50 (device #1). Under these conditions and with a 1 Mohm ballast resistor, rates of 113–124 pps were measured, the limiting factor being the recovery time of the voltage regulation of the power supply as the current drain increased. This phenomenon was exaggerated when no ballast was employed and the largest peak pulse currents were observed (not shown). With faster recovery power supplies capable of delivering the same or higher input currents (and the same large value of capacitance in parallel with the plates) much higher pulse rates (>1,000 pps) could be obtained, along with larger peak pulse RMS currents.

EXAMPLE 3

Figure 11:
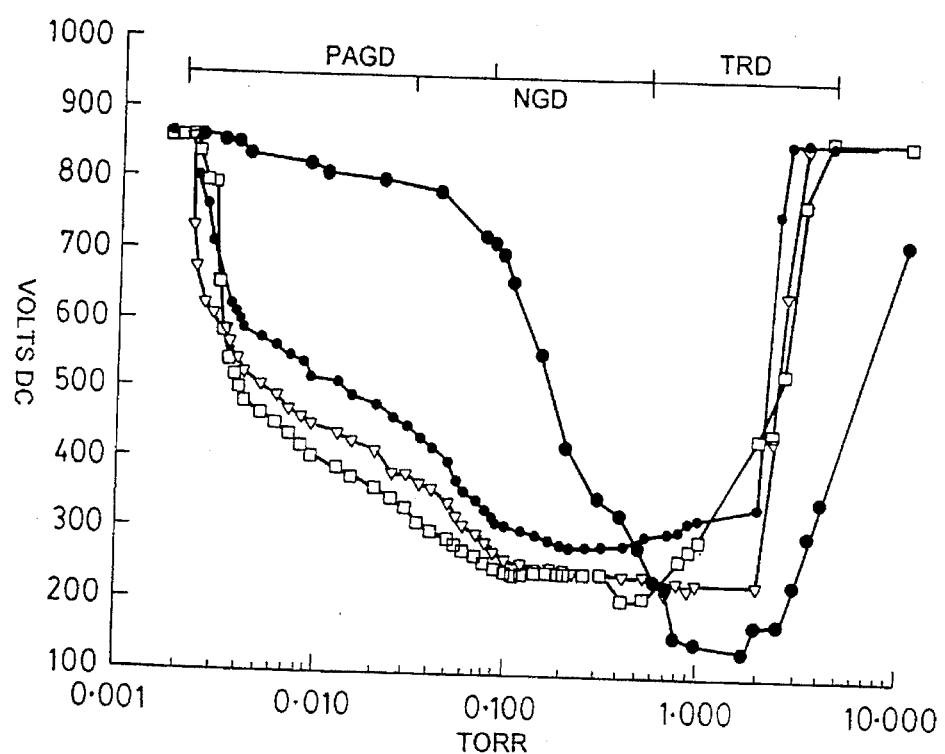
FIG. 11 illustrates a continuous variation of NGD sustaining/PAGD extinction voltages, from breakdown to glow extinction, with decreasing pressure, in 4 discharge tubes having different plate areas.

Detection of the PAGD Region in the Pulse Generator as a Function of Decreasing Pressure Argon pumpdown tests were conducted to determine whether and when the PAGD region of the discharge was apparent utilizing comparably low voltages (up to 2.5 kV). These tests were performed with both the diffusion pump off and on. FIG. 11 shows a typical curve of the variation of the sustaining/extinction voltages at the plates with decreasing pressure at the rotary pump, from breakdown (at 860 VDC) to glow extinction, for all four discharge tubes 50 examined (device #'s 3 to 6), which were assembled with H34 aluminum plates having different electrode areas: device #3, 16 cm² (small closed squares); device #4, 64 cm² (open circles); device #5, 128 cm² (open squares); device #6, 128 cm² (large closed squares). Each discharge tube 50 had the same gap distance of 5.5 cm and was assembled with the same volume of glass envelope. Devices #3 to 5 were evacuated simultaneously and an identical average direct current of 1 mA was applied to each separately, using comparable power supplies ballasted with a 1 Mohm resistor. Device #6 was evacuated in a separate test, under the same pumpdown conditions and at the same applied potential of 860 VDC at breakdown, but was subjected to a 100-fold higher, average direct current of 500 mA. It is readily apparent that the continuously varying, sustaining/extinction voltage curves shown in FIG. 11 are analogous to the Paschen gas breakdown voltage curve and that throughout most of the voltage range all three low current curves are parallel. Independent determinations of the low current breakdown voltage curves for all three discharge tubes 50 (devices #3 to 5) showed the exact same relation for all three curves as observed for the sustaining/extinction voltage curves (results not shown). The differences between the electrical discharge regimes observed as a function of decreasing pressure are most apparent in the larger plate area discharge tube 50 (device #5). The three regions of the discharge, the transitional glow, the normal glow and the pulsed abnormal glow, are clearly distinguishable for that device (see FIG. 11). FIG. 11 illustrates a continuous variation of NGD sustaining/PAGD extinction voltages (Vs/Vx), from breakdown to glow extinction, with decreasing pressure (at a rotary pump), in 4 discharge tubes having different plate areas but the same electrode material (H34 aluminum), the same gap distance and the same potential of 860 VDC prior to breakdown; all curves except that joining the large closed squares, were measured using the same low applied direct current of 1 mA; the curve joining the large closed squares was obtained with an average direct current of 500 mA; the three quasi-parallel, low current curves for discharge tubes (devices #3 to #5) having anode/cathode areas of 16 (small closed squares), 64 (open circles) and 128 cm² (open squares), respectively, were obtained during a simultaneous test; the high-current curve for a 128 cm² plate discharge tube (device #6) was measured during a separate test. In all cases, pumpdown was performed in an argon atmosphere. The scale markings for different glow discharge regions shown at the upper part of the diagram refers only to observations made with a 128 cm² area discharge tube device #5 at low applied currents. In the transitional region discharge (TRD), the cathode glow is of minimal point-like size and rapid oscillations of the striations of the plasma positive column originate quasi-sinusoidal, dampened sinusoids, ramp-like or noise-like waveforms associated with sporadic, small amplitude (2 to 15 volts), pulsed auto-electronic emissions. In this region the voltage tends to fall, while oscillating erratically at first. As the pressure further decreases, there follows a stable normal glow discharge (NGD) region, where conduction of direct current across the vacuum pre-empts the possibility of auto-electronic emission. The lowest voltages are observed in this region. After the recession of the positive column and upon glow saturation of the plate areas, just as the cathode glow is beginning to recede, the intense, large amplitude (>100 V), pulsed auto-electronic emission characteristic of the PAGD regime emerges. In this region, the voltage tends to climb until extinction occurs before the maximum voltage of 860 V is again attained. In the other two devices at the same low applied direct current, the borders of the discharge regimes are blurred. In device #3, the low intensity, small amplitude auto-electronic emissions develop into a few high intensity, large amplitude emissions, as they decrease in frequency and with considerable overlap; the PAGD and NGD regimes are also mostly mixed, until lower pressures of the order of 0.01 Torr are attained, at which point the PAGD regime functions alone at low frequency. In device #4, the NGD regime can be better distinguished from the TRD, and the PAGD from the NGD, but high intensity, large amplitude auto-electronic emissions occur early on in the NGD region as the glow saturates the plates faster than for device #5. There is a dual effect on increasing the average applied direct current 100-fold (device #6, large closed squares, shown in FIG. 11): the entire ascending arm of the voltage curve is displaced upward in the pressure scale and the modal distribution of the voltage variation is compressed. The high applied direct current also abrogates the two discharge regions that preceded the PAGD. From breakdown to extinction, the regime of the discharge is solely that of the PAGD, the positive column of the discharge weakening with the decreasing pressure.

Figure 12:
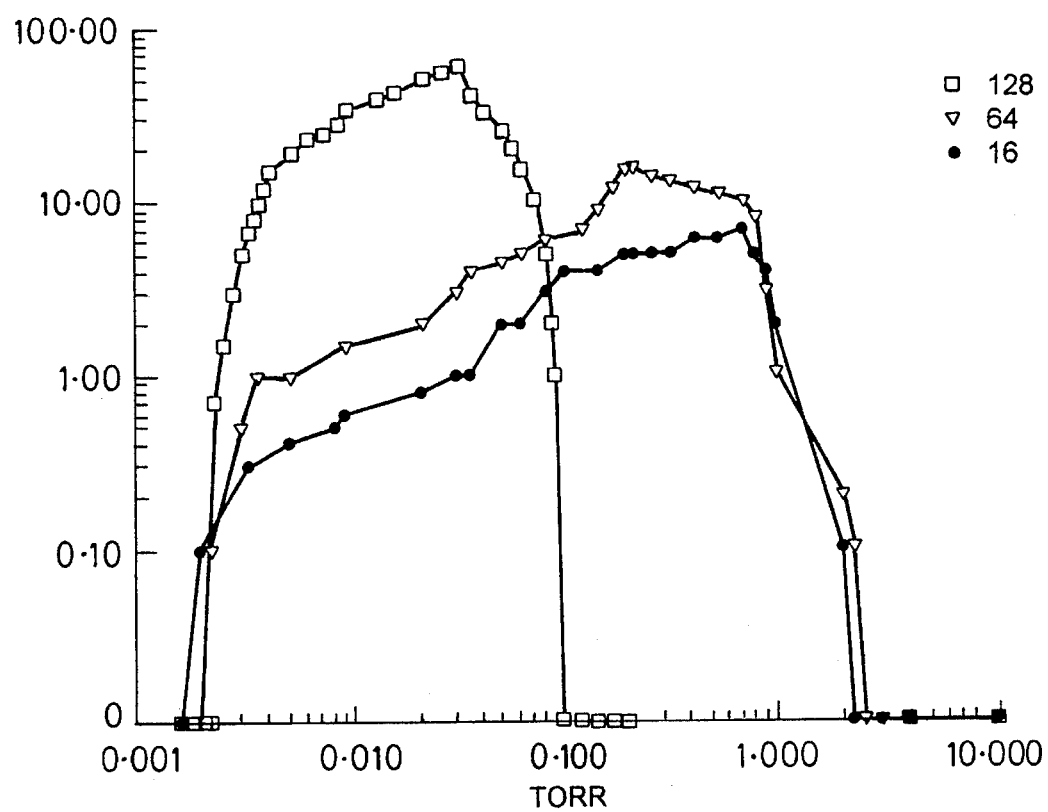
FIG. 12 illustrates a continuous variation of PAGD frequency with decreasing gas pressure in 3 discharge tubes having different anode and cathode plate areas.

FIG. 12 illustrates a continuous variation of PAGD frequency with decreasing gas pressure in 3 discharge tubes having different anode and cathode plate areas (16, 64, 128 cm²) but the same cathode material (H34 aluminum) and the same gap distance of 5.5 cm; all 3 discharge tubes (device #'s 3 to 5) were applied the same potential of 860 VDC prior to breakdown and were stimulated with the same direct current of 1 mA; pumpdown was performed with a rotary vacuum pump in an argon atmosphere; neither the quasi-sinusoidal nor the noise-like oscillations observed upon breakdown and during the transitional discharge region, nor the low intensity auto-electronic pulsed emission (2 to 15 v maximum amplitude) observed in the same region, are shown. In all three devices, the PAGD regime first appeared mixed together with the NGD regime in the form of pulses that perturbed the steady-state glow, the pulses increasing in frequency with the decreasing pressure until a maximum pulse rate was attained.

Figure 13:
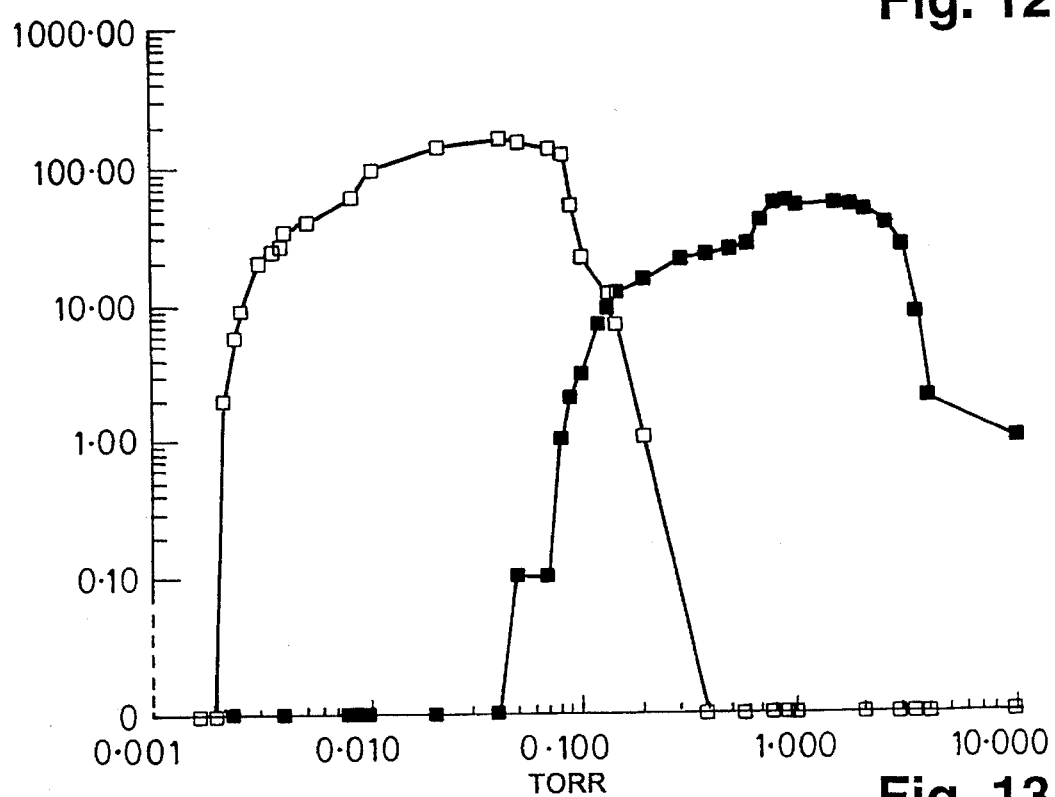
FIG. 13 illustrates a shift of the PAGD regime to higher pressure regions during pumpdown with a rotary vacuum pump.

FIG. 13 illustrates a shift of the PAGD regime to higher pressure regions during pumpdown with a rotary vacuum pump in an argon atmosphere, as a function of a 500-fold increase in applied direct current (1 vs. 500 mA), at the same starting voltage of 860 VDC and utilizing the same 128 $cm^2$ H34 aluminum plate discharge tube (device #5) in two separate tests. The higher current displaces the PAGD region upward in the pressure scale, just as was observed in the ascending arm of the voltage curve (see FIG. 11). The displacement induced by the applied high current occurs over a pressure range where, at low current (1 mA) and with the same applied potential at breakdown, some weak, low-amplitude, pulsed auto-electronic emissions are observed during the TRD.

Figure 14:
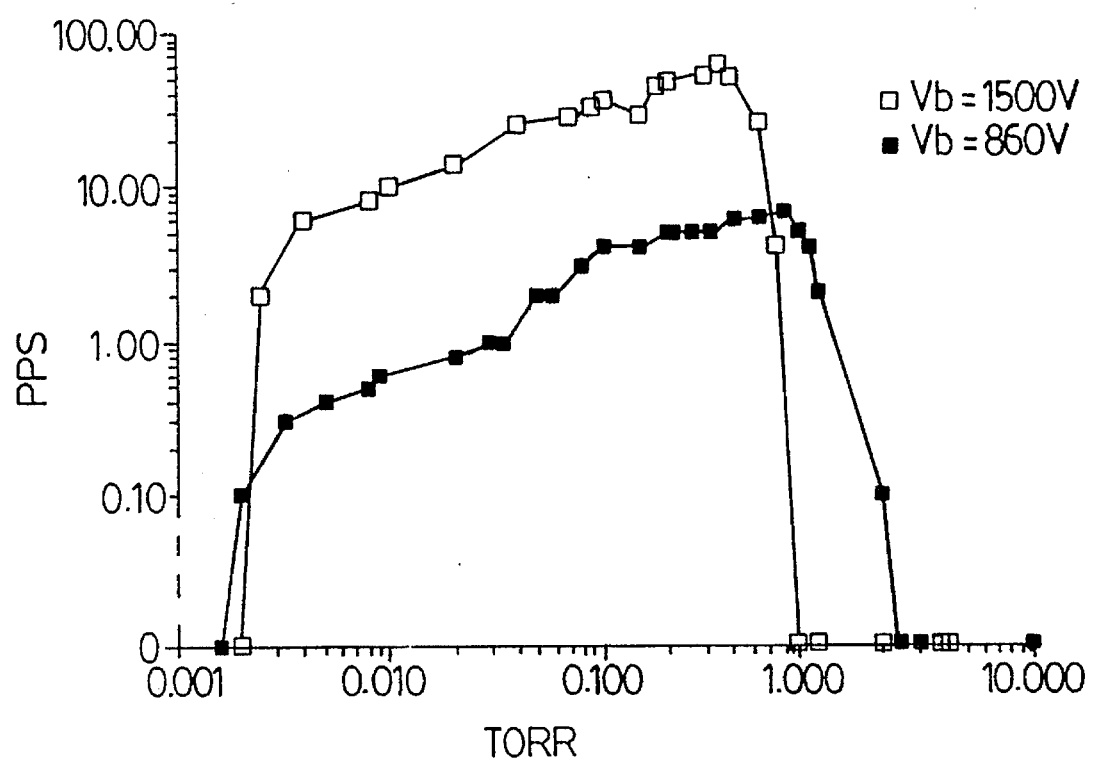
FIG. 14 illustrates a shift of the PAGD regime to lower pressure regions and higher frequencies during pumpdown.

FIG. 14 illustrates a shift of the PAGD regime to lower pressure regions and higher frequencies during pumpdown with a rotary vacuum pump in an argon atmosphere, as a function of a higher applied potential; starting voltages were 860 (closed squares) and 1500 VDC (open squares). The discharge tube (device #3) had plate areas of 16 $cm^2$ and the results shown are from separate tests with the same power supply, at low currents (average 1 mA). FIG. 14 shows the effect of increasing the starting DC voltage at breakdown by 1.75-fold (from 860 to 1507 VDC). The increased current displaced the PAGD upper pressure limit downward in the pressure scale, in opposition to the current effect and it also increased by a factor of about 8.8 the frequency of the intense, large amplitude, auto-electronic emissions.

Using the same applied low direct current and potential magnitude at breakdown (860 VDC) described for the tests represented in FIGS. 11 and 12, pumpdown of the three different plate area discharge tubes 50 (each having interelectrode distances of 5.5 cm) was performed with the oil diffusion pump on. While the effect of increasing the plate area under these conditions remained the same, ie. lowering the pressure for the same sustaining/extinction potential and displacing the PAGD region to regions of higher vacuum, there was a noticeable difference compared with the same test done with the rotary pumpdown: ie. the extinction pressure was greatly extended downward in the pressure scale for all devices, and, consequently, the PAGD region was greatly expanded into the medium to high vacuum ranges. A 128 $cm^2$ plate area discharge tube 50 with 5.5 cm gap, (devices #11 and 12) typically reached PAGD extinction at $5*10^{-5}$ Torr, though its peak pulse rate remained basically unchanged. This overall displacement of the PAGD phenomenon to higher vacuum regions under conditions of oil diffusion evacuation may well be due to the migration of very low vapor pressure oil molecules to the tube ends (despite the baffle and the cooling trap) and their interaction with residual gas molecules in the electrical field of the devices. With the diffusion pump on and voltages progressively increasing up to 2.5 kV with decreasing pressure, the PAGD regime in these discharge tubes 50 operated from $10^{-3}$ to $10^{-5}$ Torr. Typically a 128 $cm^2$ H34 aluminum plate discharge tube 50 (5.5 cm gap) will operate in the PAGD regime at $2*10^{-5}$ Torr, with an applied voltage of 2.2 kV and at a pulse rate of 30 pps. With higher vacua ($<10^{-5}$ Torr) and voltages, ultimately the PAGD regime gives way to the production of cathode rays and very weak x-rays. From several such diffusion pumpdown tests it was concluded that the PAGD was facilitated by the use of Alzak electrode material and, as it will be shown in Example 4, by larger plate areas.

EXAMPLE 4

The Effect of the Plate Area on the PAGD Characteristics During Pumpdown

The effect of increasing the plate area of the cathode 54 and anode 56 of a discharge tube 50 was tested by two methods: 1) using a pumpdown method of varying the vacuum by equilibrating of the gas flow against a rotary pump (as explained below) and 2) using sealed housings 52, 64 enclosing a vacuum of $2*10^{-6}$ Torr obtained with the diffusion pump (see Example 5).

The results from the first test is shown in FIGS. 11 and 12, for the discharge tubes 50 stimulated with low (1 mA) direct currents, at the same starting potential of 860 VDC at breakdown. A comparison indicates that the effect of increasing the plate area in discharge tubes 50 having the same gap distance, and thus the same pd value (pressure, in Torr, multiplied by interelectrode gap distance, in cm), and the same volume, is to depress the voltage, particularly in the NGD and PAGD regions and to displace the auto-electronic pulsed emission characteristic of the PAGD regime to a higher vacuum range. The peak frequency of PAGD for each given area is also attained, in each case, at a vacuum that increases proportionately to the order of increasing area ($16 \rightarrow 64 \rightarrow 128$ $cm^2$) as does the magnitude of the peak frequency of PAGD for a given gap distance. The distribution of PAGD frequencies also narrows its characteristic mode with the larger area plates, by displacing an upper pressure limit to lower pressure regions, the most significant shift in this respect being from the 64 to the 128 $cm^2$ devices (FIG. 12, open circles vs. open squares). This combined compression of the distribution mode and its shift to the left in the pressure scale corresponds to a better definition between the NGD and the PAGD regimes afforded by the discharge tube 50 with the largest plate area employed (128 $cm^2$), as discussed above in Example 3. Moreover, in accordance with Paschen's law, the observed area-dependent voltage reduction effect cannot be explained, inasmuch as the voltage is predicted to remain the same as long as the product pd is constant, even if the plate area increases. Since the interelectrode gap distance was constant for all devices and as the pumpdown was also performed simultaneously and the tubes had identical volumes, it is apparent that there is an electrode plate area effect which is not accounted for by Paschen's law. The observed plate area effect appeared to have an effect opposite to current and in the same direction of increasing potential, as it displaced the PAGD region downward in the pressure scale to higher vacuum regionsand increased the PAGD frequency. In addition, an increase in area also reduces the magnitude of the potential. From the results shown in FIG. 14, and a comparison with FIG. 12, it is apparent that an increase of 1.75-fold for a given breakdown potential of a 16 $cm^2$ discharge tube yields the same pulse rate (about 60 pps) as does an 8-fold increase in plate area for the same volume housing (52, 64), but requires a lower pressure.

A comparison of breakdown order and pressure, as well as of peak pps values and peak pps conditions carried out as a function of plate area for the discharge tubes 50 (devices #'s 3 to 5) represented in FIGS. 11 and 12, is shown in Table 2. The discharge tube 50 with the largest plate area, which was the first to undergo breakdown (during six separate tests) at the highest pressure of 3 Torr, yields an 8-fold higher PAGD rate than the discharge tube 50 with the smallest plate area of 16 cm$^2$, at the lowest pressure (the pressure is 24 times lower than that of the 16 cm$^2$ device). This peak pps rate occurs, however, at a voltage which is about 9.5% greater for the discharge tube 50 with the largest plate area. These results suggest that a larger plate area promotes breakdown at higher pressures (ie. the breakdown pressure decreases inversely to the order of increasing plate area) and supports lower sustaining/extinction voltages.

Tables 3 and 4 list sampled data from the tests shown in FIGS. 11 and 12. Table 3 shows a comparison, by fixed voltages, of values on the ascending arm of pressure dependent voltage curves for three discharge tubes 50 having different plate areas. Table 4 shows the pressure variation predicted by the Paschen law if the devices had an interelectrode gap that varied proportionally to a linear scaling factor $k_L$ (which they do not) and a pressure that varied inversely to the linear scaling factor $k_L$. In both Tables 3 and 4 the first six vertical columns describe (1) the plate area values of the three discharge tubes 50 tested, (2) the linear scaling factors $k_L$ for each discharge tube 50 based exclusively on the linear plate dimensions (ie. not implying a $k_L$ scaled gap distance), (3) their respective area scaling factors ($k_A$), (4) the interelectrode gap distances in cm, (5) the pressure in Torr and (6) the DC voltage.

Table 3 is horizontally divided into two parts. Groups A and B represent two sets of theoretical predictions derived from the Paschen law and in conformity with the Child-Langmuir theory of the NGD.

Group A represents the model for a linear scaling of all dimensions, as when the plate factor $k_L$ also applies to the distance between the plates, which thus must increase by the $k_L$ value. This requires that for the voltage to remain unchanged, the pressure must decrease by the reciprocal of the $k_L$ value. Accordingly, a theoretical pressure reduction factor (prf) is shown in vertical column 8 of Table 3, and the predicted pressure values shown in vertical column 5.

since in group B, the $k_L$ scaling factor does not apply to the gap distance, which thus remains constant at 5.5 cm, the theoretical prf is unity and the pressure remains constant if the voltage is to remain the same.

For the horizontal sample groups numbered 1 to 6, column 5 shows the experimental pressure values obtained for the same sample voltage and column 8 shows the observed prf values. Column 7 shows the experimental pps rates. It is readily apparent from the experimental values of Table 3, that identical voltages entail reduced pressures that diminish as an area dependent effect. Contrary to the prediction (group B, Table 3), and despite the fact that the interelectrode gap distance remains the same for all the discharge tubes 50 (device #'s 3 to 5), a constant voltage is only attained at a lower pressure for the discharge tubes 50 with larger plate areas. In other words, the product pd is not constant for a given voltage, and thus does not conform to the Paschen Law prediction of a prf that equals unity for all discharge tubes 50 regardless of their plate area.

In Table 4 only experimental data is presented. The predicted voltages shown in vertical column 6 of Table 4, were obtained using as parameter the experimental values observed for the discharge tube 50 with the smallest area (16 cm$^2$) used in these tests, at pressure intervals determined from arbitrary prf factors (vertical column 9, Table 4) chosen in accordance with a theoretical model of the horizontal group A from Table 3, that is, as if the reciprocal of the $k_L$ factor applied to the pressure of these discharge tubes, even though the interelectrode gap remained constant. Using those pressure intervals, and the actual voltages observed for the other two discharge tubes (64 cm$^2$ and 128 cm$^2$, vertical column 7, Table 4), the experimentally observed voltage reductions as % of the 16 cm$^2$ voltage reference (shown in column 6) were determined and are shown in vertical column 10, Table 4.

Figure 15A:
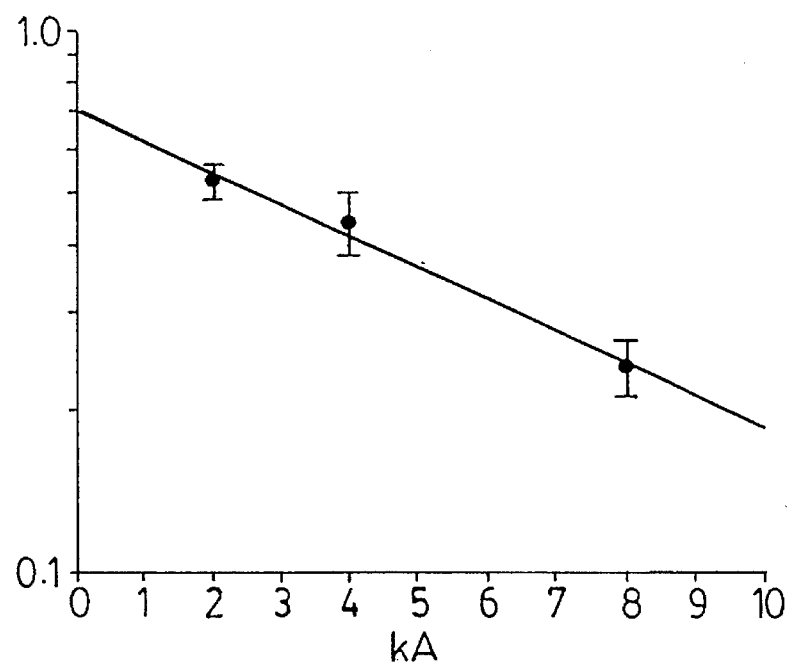
FIG. 15 illustrates the observed reductions in device pressure (FIG. 15A) and in voltage (FIG. 15B) as a function of the increase in plate area factor, for the three discharge tubes having different plate areas stimulated with low direct current during argon pumpdown under the conditions described in FIGS. 11 and 12.
Figure 15B:
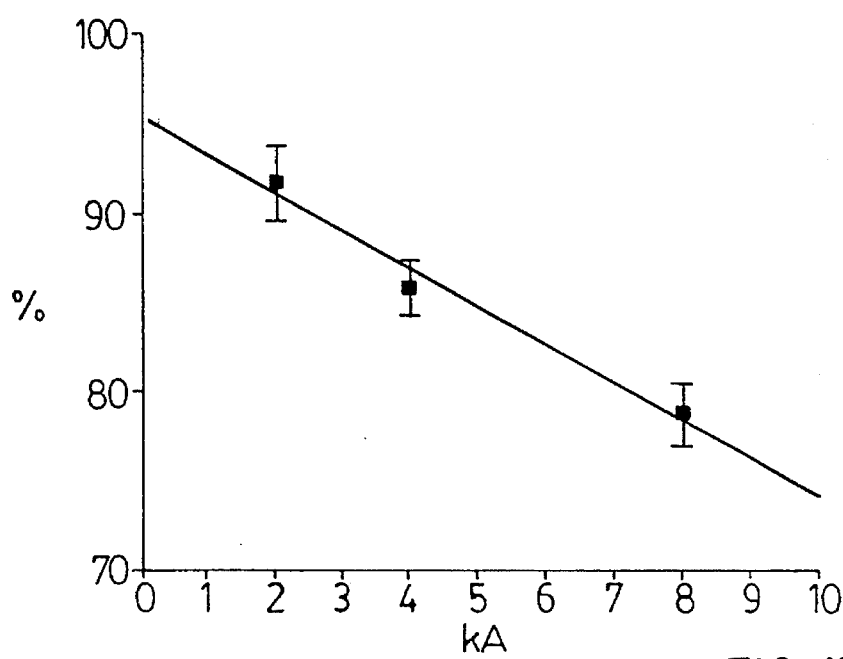

The experimental data listed in Tables 3 and 4 was then used to calculate relative, average pressure reduction factors using the fixed voltage series shown in Table 3, column 8, and percentage voltage reductions using the $1/k_L$ pressure series shown in Table 4, column 10. Those calculations interrelated all the discharge tubes used for the low current pumpdown test with respect to their plate area factors, or $k_A$ values: ie. $k_A$32 2, when comparing the 64 cm$^2$ and 128 cm$^2$ discharge tubes; $k_A$=4, when comparing the 16 cm$^2$ and the 64 cm$^2$ discharge tubes; and $k_A$=8, when comparing the 16 cm$^2$ and 128 cm$^2$ discharge tubes. To triangulate the data, $k_A$=8 results for the voltage series of Table 5 were derived by comparing the pressures obtained for the 16 cm$^2$ and 128 cm$^2$ discharge tubes, shown in Table 1. With respect to the pressure series of Table 5, whereas the 16 cm$^2$ device was used as a 100% voltage reference for the $k_A$ =4 and $k_A$=8 results, the $k_A$=2 results were determined by comparing the percentage voltage reduction for the 64 cm$^2$ and 128 cm$^2$ devices. From the triangulated data, statistical means and their standard errors were calculated to determine the regression curves of the area dependent pressure reduction effect obtained when the voltage is constant (FIG. 15A), and of the area-dependent voltage reduction as % of the maximum, when the voltage of the 16 cm$^2$ discharge tube is taken as a reference voltage and the pressure is varied arbitrarily in accordance to the reciprocal of the $k_L$ factor(FIG. 15B). FIGS. 15A and 15B strikingly illustrate the effect of increasing the $k_A$ factor or the plate area in these discharge tubes 50. A lower pressure is required for the same voltage (ie. a prf lower than unity), the voltage being depressed when the pressure is constant. Within the $k_A$ range tested, both regression curves are linear. Following the regression curve of FIG. 15A, one can predict that a $k_A$=17 will reduce the pressure by one order of magnitude. Conversely, following the regression curve of FIG. 15B, one can predict that for the same pressure and the same interelectrode gap distance, the voltage will be depressed by 50% with a $k_A$=$^-$21.5. These predictions, however, will only hold if the curve remains linear throughout a wider range of $k_A$ values.

In conclusion, the effect of increasing the plate area of discharge tubes stimulated with the same starting voltage and the same current is to: 1) shift the breakdown pressure upwards, 2) depress the working voltage, 3) increase the pulse rate both in the TRD and PAGD regions, 4) shift the PAGD region downwards in the pressure scale and segregate the discharge regimes more clearly as a function of decreasing pressure. These observations also explain why the discharge tubes with smaller plate areas shift the PAGD up in the pressure scale, as an increase in current does. Effectively, a smaller plate area not only concentrates the lines of electrostatic force in a vacuum, but it also increases the current density per unit area, with the consequent glow saturation of the plates, necessary for the abnormal glow discharge region to be attained, occurring earlier on during pumpdown, than for discharge tubes with larger plate areas.

TABLE 2

| Plate Area (cm²) | 16 | 64 | 128 |
|---|---|---|---|
| Lowest DC Voltage (5mA current) | 290 | 226 | 210 |
| Pressure (Torr) | 0.31 | 0.68 | 0.415 |
| Expected Breakdown Pressure | 2.25 | 2.25 | 2.25 |
| Breakdown Pressure Factor | 0.75 | 0.83 | 1 |
| Breakdown Order M ± SEM (n = 6) | 2.7 ± 0.37 | 2 ± 0.29 | 1.3 ± 0.23 |
| Peak PPS | 7 | 16 | 61 |
| Relative PPS Ratios | 1 | 2.29 | 8x |
|  | 1 | 3.5x |  |
| Peak PPS Pressure | 0.725 | 0.220 | 0.030 |
| Peak PPS Volts DC | 307 | 225 | 332 |

TABLE 3

| Area (cm²) | Plate $K_L$ | $K_A$ | d, cm | Predicted p (Torr) | V | PPS | Theoretical prf | Group |
|---|---|---|---|---|---|---|---|---|
| 16 | 1 | 1 | 5.5 | 0.125 | 307 | NA | NA | A |
| 64 | 2 | 4 | 11 | 0.0625 | 307 | NA | $1/K_L$ = 1/2 | A |
| 128 | 1.4 | 2 | 15.5 | 0.044 | 307 | NA | $1/K_L$ = 1/1.4 | A |
| 16 | 1 | 1 | 5.5 | 0.125 | 307 | NA | NA | B |
| 64 | 2 | 4 | 5.5 | 0.125 | 307 | NA | 1 | B |
| 128 | 1.41 | 2 | 5.5 | 0.125 | 307 | NA | 1 | B |

| Area (cm²) | Plate $K_L$ | $K_A$ | d, cm | Exptl. p (Torr) | V | PPS | Exptl.prf | Sample # |
|---|---|---|---|---|---|---|---|---|
| 16 | 1 | 1 | 5.5 | NA | 255 | NA | NA | 1 |
| 64 | 2 | 4 | 5.5 | 0.18 | 255 | 14 | NA | 1 |
| 128 | 1.41 | 2 | 5.5 | 0.092 | 255 | 1 | 1/1.96 | 1 |
| 16 | 1 | 1 | 5.5 | 0.125 | 307 | 4 | NA | 2 |
| 64 | 2 | 4 | 5.5 | 0.065 | 307 | 5 | 1/1.91 | 2 |
| 128 | 1.41 | 2 | 5.5 | 0.035 | 307 | 36 | 1/1.86 | 2 |
| 16 | 1 | 1 | 5.5 | 0.0675 | 350 | 2.5 | NA | 3 |
| 64 | 2 | 4 | 5.5 | 0.0475 | 350 | 4.5 | 1/1.42 | 3 |
| 128 | 1.41 | 2 | 5.5 | 0.023 | 350 | 56 | 1/2.06 | 3 |
| 16 | 1 | 1 | 5.5 | 0.0500 | 407 | 2 | NA | 4 |
| 64 | 2 | 4 | 5.5 | 0.0225 | 407 | 2.5 | 1/2.22 | 4 |
| 128 | 1.41 | 2 | 5.5 | 0.0090 | 407 | 30 | 1/2.5 | 4 |
| 16 | 1 | 1 | 5.5 | 0.0310 | 450 | 0.8 | NA | 5 |
| 64 | 2 | 4 | 5.5 | 0.0091 | 450 | 1.5 | 1/3.4 | 5 |
| 128 | 1.41 | 2 | 5.5 | 0.0060 | 450 | 22 | 1/1.52 | 5 |
| 16 | 1 | 1 | 5.5 | 0.0140 | 500 | 0.65 | NA | 6 |
| 64 | 2 | 4 | 5.5 | 0.0060 | 500 | 1.2 | 1/2.33 | 6 |
| 128 | 1.41 | 2 | 5.5 | 0.0038 | 500 | 5 | 1/1.58 | 6 |

TABLE 4

| Area (cm²) | Plate $K_L$ | $K_A$ | d (cm) | p (Torr) | V Predicted | V Observed | PPS | Chosen p Factor | Voltage Reduction as % | Sample # |
|---|---|---|---|---|---|---|---|---|---|---|
| 16 | 1 | 1 | 5.5 | 0.800 | 318 | 318 | 4 | NA | NA = 100% | 1 |
| 64 | 2 | 4 | 5.5 | 0.400 | 291 | 253 | 10 | ½ | 86.94 | 1 |
| 128 | 1.41 | 2 | 5.5 | 0.2283 | 290 | 250 | 0 | 1/1.42 | 86.2 | 1 |
| 16 | 1 | 1 | 5.5 | 0.400 | 291 | 291 | 5 | NA | NA | 2 |
| 64 | 2 | 4 | 5.5 | 0.200 | 295 | 257 | 15 | ½ | 87.1 | 2 |
| 128 | 1.41 | 2 | 5.5 | 0.141 | 309 | 243 | 0 | 1/1.41 | 78.6 | 2 |
| 16 | 1 | 1 | 5.5 | 0.200 | 295 | 295 | 4 | NA | NA | 3 |
| 64 | 2 | 4 | 5.5 | 0.100 | 327 | 260 | 6.5 | ½ | 79.5 | 3 |
| 128 | 1.41 | 2 | 5.5 | 0.070 | 350 | 265 | 9.5 | 1/1.41 | 75.7 | 3 |
| 16 | 1 | 1 | 5.5 | 0.0800 | 334 | 334 | 3 | NA | NA | 4 |
| 64 | 2 | 4 | 5.5 | 0.0400 | 422 | 365 | 4.25 | ½ | 86.5 | 4 |
| 128 | 1.41 | 2 | 5.5 | 0.0283 | 457 | 347 | 58 | 1/1.41 | 75.9 | 4 |
| 16 | 1 | 1 | 5.5 | 0.0400 | 422 | 422 | 1.5 | NA | NA | 5 |
| 64 | 2 | 4 | 5.5 | 0.0200 | 473 | 415 | 1.8 | ½ | 87.7 | 5 |
| 128 | 1.41 | 2 | 5.5 | 0.0141 | 500 | 378 | 33 | 1/1.41 | 75.6 | 5 |
| 16 | 1 | 1 | 5.5 | 0.0200 | 473 | 473 | 0.8 | NA | NA | 6 |
| 64 | 2 | 4 | 5.5 | 0.0100 | 515 | 450 | 1.6 | ½ | 87.4 | 6 |
| 128 | 1.41 | 2 | 5.5 | 0.0700 | 555 | 445 | 27 | 1/1.41 | 80.2 | 6 |
| 16 | 1 | 1 | 5.5 | 0.0800 | 550 | 550 | 0.5 | NA | NA | 7 |
| 64 | 2 | 4 | 5.5 | 0.0400 | 600 | 535 | 1.0 | ½ | 89.2 | 7 |
| 128 | 1.41 | 2 | 5.5 | 0.00283 | 760 | 800 | 3.0 | 1/1.41 | −5.3 | 7 |

TABLE 5

| Plate $K_A$ | | | | |
|---|---|---|---|---|
| 2 | 4 | 8 | Sample # | |
| Pressure reduction factors | | | Voltage series | |
| 0.51 | NA | NA | 1 | |
| 0.54 | 0.52 | 0.28 | 2 | |
| 0.485 | 0.70 | 0.34 | 3 | |
| 0.4 | 0.45 | 0.18 | 4 | |
| 0.65 | 0.29 | 0.19 | 5 | |
| 0.63 | 0.43 | 0.27 | 6 | |

| | 2 | 4 | 8 | |
| Mean | 0.52 | 0.44 | 0.24 | |
| ±SEM | ±0.04 | ±0.06 | ±0.03 | |

| Plate $K_A$ | | | | |
|---|---|---|---|---|
| 2 | 4 | 8 | Sample # | |
| Voltage reduction as % of maximum | | | Pressure Series | |
| 99.1 | 86.9 | 86.2 | 1 | |
| 90.2 | 87.1 | 78.6 | 2 | |
| 95.2 | 79.5 | 75.7 | 3 | |
| 87.7 | 86.5 | 75.9 | 4 | |
| 86.4 | 87.7 | 75.6 | 5 | |
| 91.7 | 87.4 | 80.2 | 6 | |
| Mean 91.7 | 85.85 | 78.7 | | |

TABLE 5-continued

| ±SEM | ±2.1 | ±1.6 | ±1.8 |

EXAMPLE 5

The Effect of Plate Area on the PAGD Characteristics of Discharge Tubes Enclosing a High Vacuum

Figure 16:
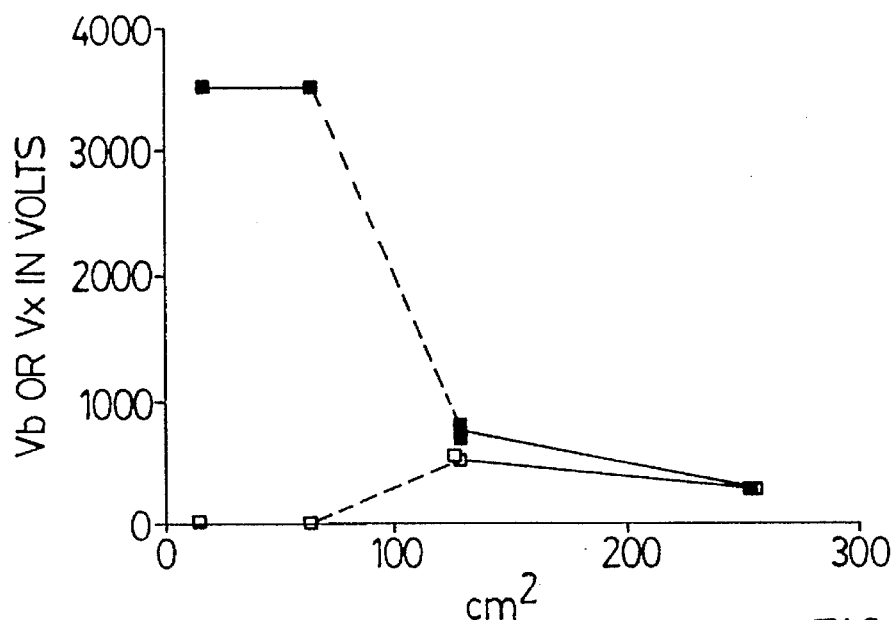
FIG. 16 illustrates observed effects of plate area upon the PAGD breakdown (Vb) and extinction (Vx) voltages for 7 separate discharge tubes.
Figure 17:
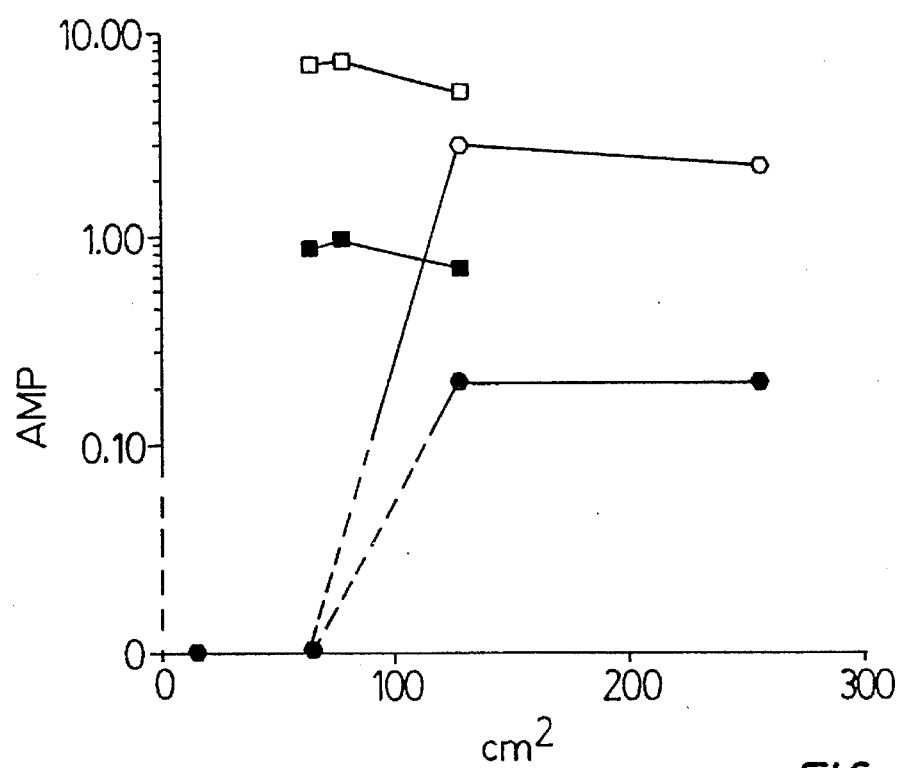
FIG. 17 illustrates the effect of plate area upon input DC and transduced RMS currents in 7 discharge tubes.

The second method used to test the effect of increasing the electrode plate area in the design of a discharge tube 50 made use of glass housings 52 enclosing a final vacuum of $2*10^{-6}$ Torr obtained with a diffusion pump on. These tests were performed with high direct currents (200 mA to 1 A). All discharge tubes tested (device #'s 7 to 13) had an interelectrode gap distance of 5 cm, enclosed the same volume and the same vacuum, and were assembled with H34 aluminum plates having plate areas which varied by an area factor of $k_A=2$, namely: 16, 32 (not tested), 64, 128 and 256 cm². At a seal off vacuum of $2*10^{-6}$ Torr, the first two discharge tubes 50 tested in this series (16 and 64 cm², device #'s 7 to 10) remained unresponsive (no signs of discharge). Even when 3.3 kV was applied, one of the 64 cm² discharge tubes showed only a faint glow (also see discussion of results for groups #1 and #4 of Table 6 below). The results for the $k_A=2$ series are shown in FIG. 16. The results indicate that when the current, the interelectrode distance and the pressure are all kept constant, the breakdown potential (Vb) for the PAGD decreases with an increase in plate area. For the largest plate area tested (256 cm²), the PAGD breakdown (287 V) and extinction (Vx=284 V) voltages practically coincide, suggesting that larger areas might depress both Vb and Vx still further. These results were recorded under identical conditions of applied direct current (200 mA, closed circles, FIG. 17), of peak pulse RMS current (open circles, FIG. 17) and of pulse frequency (20 pps), using an earth-grounded centertap power supply with both positive and negative voltages applied simultaneously to the respective plates. Under the same conditions of applied total power (same starting voltage, but higher applied direct current because of their lower sustaining/extinction voltage), three discharge tubes 50 built with Alzak plates having areas of 64, 78 and 128 cm² respectively were tested with the same power supply. As shown in FIG. 17, these discharge tubes conduct 5-fold higher DC currents (closed squares, FIG. 17), transduce 3-fold higher peak pulse RMS currents (open squares, FIG. 17) and yield a 20 to 30-fold increase in pps (from 20 to 600 pps) at similar field strengths, when compared with the results obtained using hardened aluminum plates.

Table 6 shows the experimental and predicted results obtained with 4 discharge tubes 50 (device #'s 9, 11, 13 and 17) assembled with hardened aluminum plates, as a function of scaling the plate area (column D) by a $k_A=2$ area factor (column E), while varying the interelectrode distance inversely with respect to the pressure (group #'s 1–3) or, alternatively, keeping these factors constant (group #'s 4–6), so that in both instances the pd product is constant. A plate area $k_A$ factor of 2 corresponds to a plate linear scaling factor $k_L$ of $2^{1/2}=1.41$. Columns A to C show the scaling of the selected linear dimensions, while column G shows the vacuum measured when the respective housings 52 were sealed. The space charge theory of glow discharge holds that the function V, or the voltage difference at corresponding points, is the same in $k_L$-scaled vacuum tubes, the linear dimensions (including the interelectrode gap distance) of a vacuum tube "b" being $k_L$ times the linear dimensions of a vacuum tube "a". Under these conditions where the gap distance also increases by the $k_L$ factor, the Poisson term $d^2*V$ (where $d^2V=r/e_o$; r= density of the attracting matter at the point chosen (charge density) and $e_o$=permittivity of free space) in the interelectrode space of vacuum tube "a" is $k_L^2$ times that in vacuum tube "b", as long as the pressure p changes by $1/k_L$ so that, to a first approximation, the breakdown voltage remains the same. As the permittivity of free space is deemed to be a constant, the charge density r in vacuum tube "a" is $k_L^2$ times that of vacuum tube "b" (the upscaled device). Consequently, the cathode current density J of vacuum tube "a" is also expected to be $k_L^2$ times that of vacuum tube "b". We can thus summarize these predictions as: given a linear factor $k_L$ between "a" and "b", two vacuum tubes will have the same breakdown voltage if the pressure of "b" decreases by $1/k_L$, with the result that J should decrease by $1/k_L^2$ and the field strength should also decrease by $1/k_L$, while $J/p^2$ and $E/p$ (where E=electrical field strength) both remain constant. Essentially, as the area factor between the two discharge tubes is $k_A=k_L^2$, both the charge density r and the current density J should change by $1/k_L^2 = 1/k_A$, ie inversely to the plate area factor $k_A$. The field strengths predicated from the Poisson term (E=−dV), are shown in column H, and their corresponding E/p ratios to be expected are shown in column J. Pulse rate (column L) was kept low and constant, for purposes of comparison between the groups. The experimental values measured at breakdown for each device are shown in Table 6, columns I (for the field strength E) and K (for E/p). These results indicate that, for $k_L$ (=1.4)-scaled discharge tubes shown in group #'s 1 to 3, Table 6, having a $k_A=2$ and inversely varying p and d values (the product pd is constant but the pressure and distance terms obey the $k_L$-scaling inverse relation) the variation of E is nonlinear (in fact, one would expect group #2 to be just as unreactive as group #1, Table 6, at these pressures). The Table 6 results for $k_L$ (=1.4)-scaled discharge tubes (group #'s 4–6, corresponding to device #'s 9–10, 11–12 and 13, respectively) with a $k_A=2$ but separate constant values for p and d, also show that the field strength E necessary for breakdown at these high applied currents does not remain constant and linear, as predicted, but decreases nonlinearly with an increased plate area, which is the only factor that changed in the series of group #'s 4–6 (device #'s 9–10, 11–12 and 13). It is significant that in this context, the field strength necessary to achieve the same pulse rate fell by ⅓rd (a factor of 2.8×) as the area increased by a factor of 2, in device #'s 11 and 12 versus 13 (group #'s 5 and 6). This strongly indicates that, in discharge tubes enclosing a high vacuum obtained under oil diffusion conditions and stimulated with high currents, the plate area has a synergistic effect on PAGD production. The same frequencies of discrete, intense emission were obtained with lower field strengths for the plasma discharges triggered by these autoelectronic emissions. Consequently, in discharge tubes 50, large plate areas promote PAGD behavior at high vacua and at low field values not predicted by the space charge theory.

TABLE 6

| No. | A<br>W<br>(cm) | B<br>L<br>(cm) | C<br>Plate<br>($K_L$) | D<br>Area<br>(cm²) | E<br>$K_A$ | F<br>d<br>(cm) | G<br>p<br>(Torr) |
|---|---|---|---|---|---|---|---|
| 1 | 16 | 4 | 1 | 64 | 1 | 3.6 | $2.8 * 10^6$ |
| 2 | 32 | 4 | 1.41 | 128 | 2 | 5 | $2.0 * 10^6$ |
| 3 | 32 | 8 | 1.41 | 256 | 2 | 7 | $1.4 * 10^6$ |
| 4 | 16 | 4 | 1 | 64 | 1 | 5 | $2 * 10^6$ |

TABLE 6-continued

| | | | | | | | |
|---|---|---|---|---|---|---|---|
| 5 | 32 | 4 | 1.41 | 128 | 2 | 5 | 2 * 10⁶ |
| 6 | 32 | 8 | 1.41 | 256 | 2 | 5 | 2 * 10⁶ |

| No. | H<br>E<br>Predicted | I<br>E<br>Exptl | J<br>F/p<br>Predicted | K<br>E/p<br>Exptl | L<br>PPS |
|---|---|---|---|---|---|
| 1 | 21,500 | >97,222 | $7.75 * 10^9$ | $>4.9 * 10^{10}$ | 0 |
| 2 | NA | 15,480 | NA | $7.75 * 10^9$ | 20 |
| 3 | 10,320 | ND | $7.75 * 10^9$ | ND | ND |
| 4 | 15,480 | >70,000 | $7.75 * 10^9$ | $>3.5 * 10^{10}$ | 0 |
| 5 | NA | 15,480 | NA | $7.75 * 10^9$ | 20 |
| 6 | 15,480 | 5,600 | $7.75 * 10^9$ | $2.8 * 10^9$ | 20 |

NA = Not Applicable
ND = Not Determined

Figure 18A:
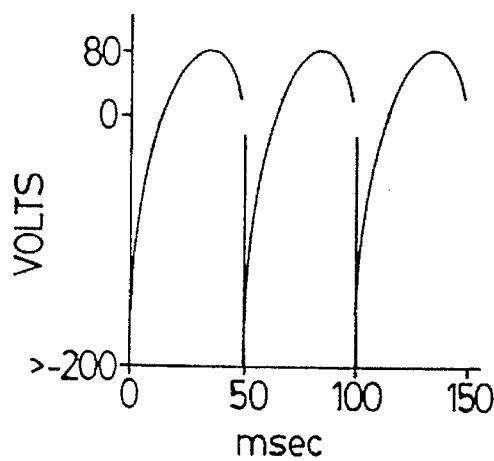
FIGS. 18A, B and C are oscillograms depicting AGD pulses in different regions of a circuit as shown in FIG. 20B.
Figure 18B:
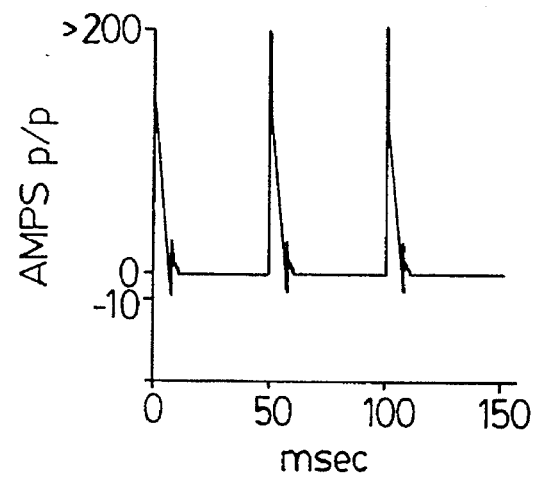
Figure 18C:
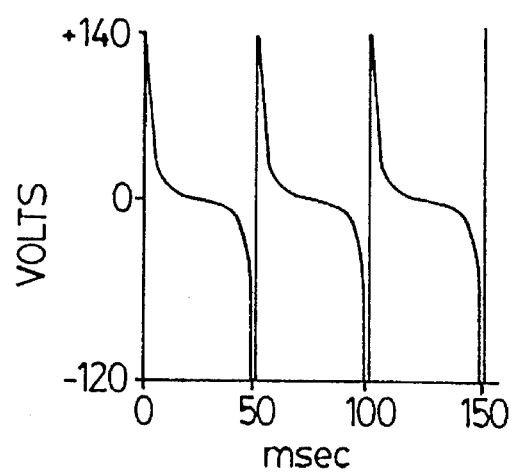

A comparison of pulse counts at the axial probe 62 (see FIGS. 2 and 4) in discharge tubes 50 and the pulse counts at the cathode 54 showed that the axial probe 62 accurately reflects interelectrode events. This correspondence was confirmed using oscillographic analysis of the probe waveform, which showed it to be functionally equivalent to that measured at the cathode 54. FIG. 18 shows voltage and current oscillographs over time of AGD self-generated auto-electronic emission pulses (at 10 pps) in an H34 128 cm² discharge tube 50 (device #1), registered as amplitude discontinuities between the anode 56/cathode 54 in FIG. 18A, as current pulses at the cathode 54 in FIG. 18B and as dual polarity field direction reversals of a split axial probe 62 in FIG. 18C. Typically, for a closed high vacuum discharge tube 50 with a plate area of 128 cm² and an interelectrode gap of 5 cm, a breakdown potential of 668 volts, an average applied current of 500 ma, and at 200 pps, the pulse amplitude is more than 300 volts. Under rotary pumpdown conditions and for an identical discharge tube, the pulse amplitude (encompassing both positive and negative components, the latter being the prominent value) increases with decreasing pressure, from 60 volts at about 0.5 Torr (with 5 mA DC) to greater than 300 volts at 0.008 Torr. In the closed high vacuum discharge tube with H34 plates having an area of 128 cm² (device #1), higher resolution oscillographs taken at the axial probe 62, show that the negative component precedes the positive reversal and has a typically higher amplitude (140 V vs. 80 to 120 V, respectively, for this situation shown in FIG. 18C). Clearly, upon an abnormal glow discharge pulse, the recovery of the field strength within these discharge tubes overshoots a 'closed switch state' (where the current I approaches zero) and results in a net flow of positive charge past the probe, towards the cathode (which is the floating ground reference level for these measurements).

EXAMPLE 6

Figure 19:
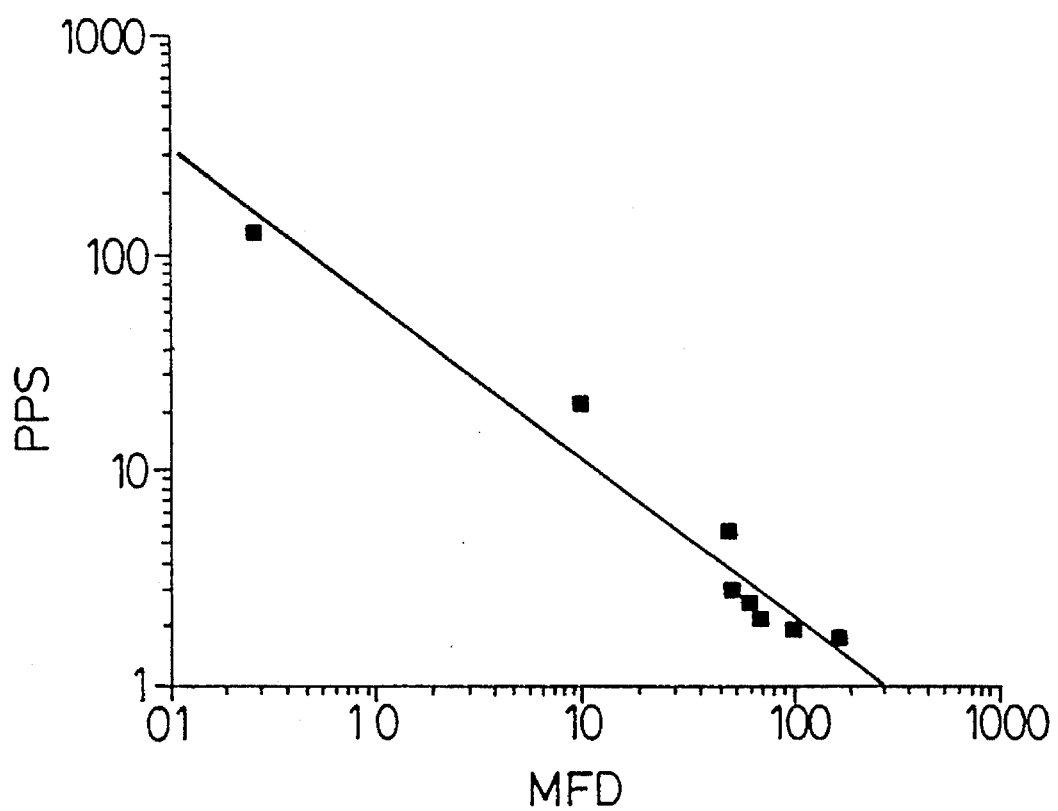
FIG. 19 illustrates an effect of varying the capacitance of a power supply in parallel with the tube, on the frequency of PAGD production.

Using the same breakdown voltage of about 668 VDC, the effect of varying the capacitance of the power supply, set in parallel with the discharge tube (device #1), on the frequency of PAGD production was determined while maintaining all other variables constant (interelectrode gap, plate area, applied voltage and current levels). The linear regression in FIG. 19 shows that, under these conditions, the PAGD frequency is increased by lower capacitances. The log slope indicates that the pps rate is doubled as the capacitance decreases by ⅔rds. Measurements were also taken of the 'non-dynamic' capacitances of discharge tubes with H34 aluminum plates having different plate areas. These were insignificant when compared with the parallel capacitances used in the power supply in tests illustrated in FIG. 16, and were observed to vary in accordance with the dielectric law, ie. doubling the plate doubled the capacitance. Thus for a plate area of 64 square cm, capacitance of 1 pF, for 128 sq. cm, 2.05 pF, and for 256 sq. cm, 4.1 pF.

Further Factors Influencing PAGD Production

Prolonged operation of discharge tubes 50 has provided some geometrical guidelines for promoting PAGD production:

1) it is advantageous if the discharge does not wander to the back of the cathode 54 and this is facilitated by using a semi-cylindrical cathode in cylindrical housings 52 and a flat cathode (rectangular, square or circular) in parallelepiped-shaped housings 64 (see FIGS. 3 & 5). However, interelectrode gap tests are best done with flat plates which assure a homogenous potential. Moreover, the semicylindrical electrodes are best made of hardened aluminum, at least 0.5 to 1 mm thick, and this requires forming them to the right curvature, given that foil alternatives are not resistant to the deleterious effect of high-current PAGD transduction at very high frequencies and do not withstand disruptive VAD discharges. Nonetheless, a semi-cylindrical electrode configuration in a housing 52 makes the sheaths (where ionic recombination occurs during glow discharge) near the electrodes and the housing wall coincide, and this can be highly advantageous for sustaining PAGD production. The same applies to flat plates in flat surface parallelepiped housings 64.

2) The most effective axial probe 62 is either a single half-length rigid rod or a pair of axial probes 62 separated at the center of the discharge tube 50 by a gap of more than 1 cm, 4–6 cm being optimum. Whereas an axial wire will perform satisfactorily as a probe 62, the rigid rod has the advantage of not yielding to a direct mechanical transduction of the electrodynamic force effected upon it by the discharge or to force created by the acquisition of a constant space charge. A split axial probe 62 facilitates the exciter function and assures PAGD operation by preventing a formation of a stable axial space-charge at high-current operation.

3) A cooling coil (made of rubber, polymer, glass or copper tubing) surrounding housing 52/64 is useful to counterbalance the heating of the anode 56/cathode 54 which promotes the production of semi-thermionic VAD channels and even thermionic normal glow discharges. A coolant pipe system that weaves through the plates can also be used for this purpose, in which case flat plates are preferred.

4) Larger anode 56/cathode 54 surfaces are required as the interelectrode gap is increased. And inversely, larger anode 54/cathode 56 surfaces operate best if larger interelectrode gaps are used; however, the breakdown voltage also increases with larger interelectrode gaps.

5) One of the limitations of these discharge tubes stems from their continuous operation at high applied currents and from eventual slippage into the VAD regime, both of which promote a deposit of sputtered metal atoms on the inner walls of the housing 52, 64 thereby making them conductive. In order to minimize this problem, electromagnets may be wound longitudinally over the housing 52, 64 (one at each end), to limit lateral dispersion of the discharge vortices.

It is apparent that several factors affect PAGD production namely: cold cathode work function, voltage, current, parallel capacitance, gas fill, pressure, geometry plate area and interelectrode gap distance. Except for capacitance at the high end of the scale, each of these factors affect the high and low limits of the PAGD, for any given set of conditions. Heretofore, parameters such as plate area in vacuum tubes have not been previously identified as factors which affect the breakdown field values and the sustaining/extinction potentials of a glow or an arc discharge. This suggests that the observed auto-electronic field emission in the PAGD regime is a function of physical factors which to date have been unrecognized. It further suggests that field emission is not a property exclusive to the VAD, ie. that it is also a property of the pulsed operation of an abnormal glow discharge in low to very high vacua.

The present discharge tubes 50 provide a design capable of transducing high peak pulse currents at very low field strength, over a wide range of frequencies with minimal slippage of the PAGD operation into either the NGD or the VAD regimes.

Although the examples described above utilise discharge tubes with symmetrical anode and cathode plates and floating probe electrodes, many other arrangements are possible. Thus the characteristics of the tubes may be adjusted by connecting the probe (or probes) through a capacitor to the anode or cathode to form an auxiliary anode or cathode.

Figure 21B:
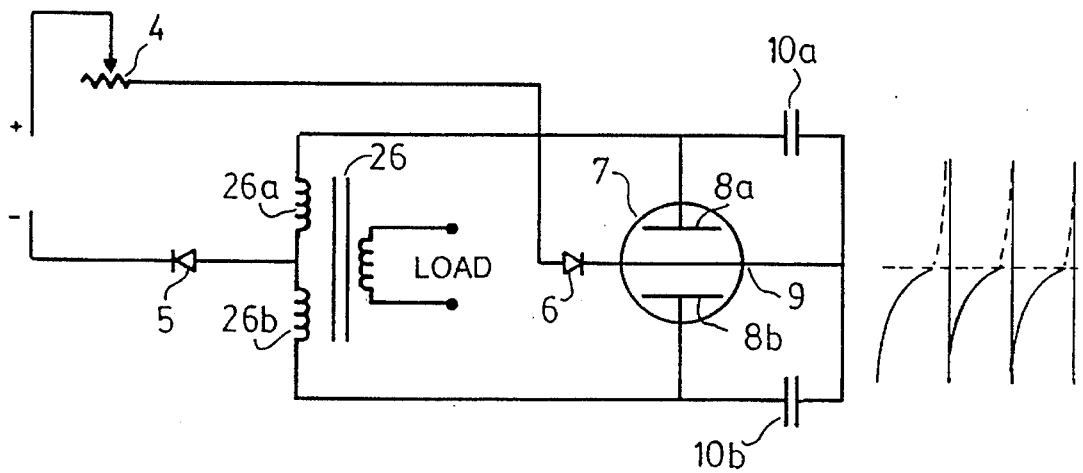

Since only the cathode need be have an extended surface area, the probe of the tubes described may be connected as an anode, with the plate electrodes connected as either strapped or independent cathodes. Examples of such connections are shown in FIGS. 21A and 21B, which show how to incorporate a discharge tube operating in the PAGD regime in an inverter circuit so that the pulse output may be utilized by a remotely located alternating current device. The intermittency of the pulses produced by the arrangements described above are not conducive to efficient operation of conventional transformers, and a push-pull circuit arrangement is preferred. While such an arrangement could utilize two discharge tubes, an advantageous arrangement utilizes a single tube of the type described in the parent application, as shown in FIG. 21A. In this instance, both plates 8a and 8b of the tube act as cathodes and are connected to the diode 5, and the probe or auxiliary electrode, which is typically of tungsten, acts as a common anode 9 and is connected to the diode 6. The capacitors 10a and 10b are connected to opposite ends of a centre-tapped primary winding of a transformer 26, providing an alternating circuit output through a secondary winding. The centre-tap of the primary winding is connected to the electrode 9. The two halves of the primary winding inductively couple the cathode circuits in antiphase, thus synchronising the PAGD pulse trains involving the two cathodes in antiphase.

In a modification of the circuit, shown in FIG. 21B, the capacitors 10a and 10b are connected directly to the electrode 9, and the primary of the transformer 26 is connected directly between the two cathodes with its centre tap connected to the diode 5. Whilst this arrangement bears some superficial resemblance to known inverter circuits employing VAD devices, it should be noted that the circuit is completely self-commutating, and does not need moving external magnetic fields to provide commutation as in the prior art.

The electrodes themselves may be formed in various configurations. Provided that both the anode and cathode electrodes have sufficiently low impedance to sustain the current densities associated with PAGD without rapid deterioration or overheating, particularly of the cathode, and provided that the cathode presents a surface of extended area to the anode and is sufficiently separated from it that the cathodic plasma eruptions associated with AGD do not reach the anode to complete a VAD channel, the electrode separation and cathode surface area can be varied over a wide range. Large cathode surface areas tend to reduce the potential required to initiate AGD, and reduced electrode separations increase the risk of entering the VAD region. In practice the cathode area should usually be at least 2 sq. cm and preferably at least 16 sq. cm, and the electrode spacing should be at least 2 cm and preferably at least 3.5 cm.

Particularly when the probe is used as an anode, it may advantageously be formed as a wire grid or mesh parallel to one or more plate electrodes acting as a cathode or cathodes. Cathodes may be arranged on one or both sides, or surrounding a rod anode, or facing a point anode.

Table 7 shows PAGD frequency results for various electrode configurations which have been tested. Configuration sd is a diode with plate electrodes and no probe, and configuration sd* adds an unconnected axial probe. In configuration t the probe was connected by a capacitor to the cathode. Configurations dd1 and dd2 use double diode configurations, with plate cathodes and an intermediate anode, a rod in the first case and a plate in the second case. Configuration cd used a cylindrical cathode and an axial rod anode. These tests indicate that an extended area of both the anode and cathode is desirable, although the area of the cathode has a greater influence.

TABLE 7

"Broken in" H34 cathodes (128 cm² plates for all configurations except cd; >1 × 10⁶ pulses) at 0.8 Torr pressure, 6 cm distance between plates, 3 cm distance of plate to axial or intercalated member, when applicable. V~540DC; Iav = 0.3A.

| Configuration | PPS (@ 1' running where n = 30) | Gap in cm. |
| --- | --- | --- |
| sd | 10 ± 2 | 6 cm. |
| sd* | 6 ± 3 | 6 cm. |
| t | 19 ± 4 | 6 cm. |
| dd (1) | 65 ± 11 | 3 cm. |
| dd (2) | 88 ± 7 | 3 cm. |
| cd° | 121 ± 14 | 3 cm. | sd* = single plate diode with axial member not conected
cd° = cylindrical cathode area of 876.5 cm²

The anode is preferably formed of metal of a relatively high work function, and the cathode of metal of a comparatively low work function, although in many cases the same material may be used for both as exemplified above. In discharge tubes, where it is desired to be able to reverse plate polarity, utilisation of the same metal for both electrodes will be advantageous. For axial probes or axial anodes, tungsten will give good results. Hollow or solid rods of the same metals selected for the cathodes may also be employed. Axial rods of tungsten or other selected metals may also be used as cathodes provided that they present sufficient surface area to th anode.

The best cathode materials identified to date are aluminum and its alloys, zinc, nickel, soft iron and silver. Cathodes made of copper and its alloys, and of steel, support PAGD but are of much poorer performance.

In Table 8 sampled data from experiments performed with different cathode metals (elemental or alloys) are shown. Except for the first two entries in Table 8, which utilized a perpendicular "surface-to-point" type configuration (with the "point" being the lateral area of a tungsten rod utilized as a cathode), all the other entries were obtained with single diode configurations, utilizing parallel plates at various gap distances. Most of the column headings are self-explanatory, but it should be noted that the voltages shown are breakdown values which, when indicated, are also minimal breakdown voltages for the discharge type shown.

As exemplified in entries 1 and 2, for two different Argon pressures, tungsten cathodes can support the same cold-cathode type of low-field spontaneous emission responsible for the PAGD regime which we have identified in diverse aluminum cathodes. This matches the previous observation of such discontinuous emissions being aided by an axial tungsten member when discharge tubes with aluminum plates are connected in the triode configuration. A higher potential (750 VDC), however, is needed with this configuration and tungsten cathodes, than that required by the lowest area aluminum plates tested (cp entries 1 and 2 with 3–7).

In entries 3 to 12, small (4 cm2) H34 aluminum plates are compared for different gap distances (3 vs. 9 cm), and within each group (entries 3 to 7, and entries 8 to 12) for varying pressure and nature of the residual gas. The net effect of increasing the gap distance is to increase the potential needed for electrical breakdown of the vacuum (cp VDC values for entries 4–7 with 9–12), as expected from Paschen's law. A trend for higher PAGD input currents, as a function of the higher vacua, is also apparent throughout this group.

In entries 13 to 28, wider aluminum cathodes (16 cm2) were compared at two different gap distances (2 and 4 cm, respectively, for entries 13 to 20 and 21 to 28), for different pressures in air or argon atmospheres. At the same specified battery breakdown voltages utilized, the shorter gap produces much higher PAGD frequencies (100 PPS vs 30–52 at 0.8 T Argon, respectively, entry 14 and entries 25 and 28). The shorter gap also promotes the setting in of a vacuum arc discharge, when compared to the larger gap at the same voltage and potential (cp entry 16 with entry 26). Lastly, it is apparent that the PAGD frequency equally increases in the presence of argon (entries 24–26) with respect to air (entries 21–23), and with increasing input current (see entries 17 to 19) within the current range characteristic of the PAGD at the same pressure (1 Torr).

In entries 29 to 35, and 75 to 76, utilization of brass cathodes is examined for purposes of PAGD production. Within the PAGD current and voltage ranges determined for aluminum and other metals, brass cathodes perform poorly, with low or very low pulsation frequencies (entries 30, 31 and 76) and very erratic bursts of activity (entries 32, 34 and 35). Unlike the typically single aluminum and tungsten PAGD emission foci, brass presents multiple small cathode spot localizations in the same pulse. The pulsed emission, however, like those of aluminum, follows the same cyclic path of abnormal glow saturation, focusing of the discharge at the emission foci, and subsequent collapse of the saturated glow.

Results for bronze-aluminum alloy cathodes are shown in entries 36 to 41, and they indicate that this alloy does not perform as satisfactorily as aluminum for PAGD production, but it is certainly utilizable. However, like brass, in the presence of Argon, erratic bursts of emission pulses are also observed (cf entry 41), without the development of a VAD-type regime.

Iron, nickel and zinc cathodes, tested in the following sequences (respectively entries 42–50, 51–53, and 54–60), proved to be amongst the best cathodes for PAGD production this purpose. Quasi-regular high PAGD frequencies are possible utilizing these metals (cp entry 49 & entry 60), which appeared to perform best with argon rather than air.

Iron plates seem to eject the least metal and can sustain very regular frequencies of pulsed abnormal glow discharges. Zinc cathodes ejected the most metal and most easily slipped into a vacuum arc discharge having the aspect of a meandering flame surrounding the cathodes spots. With zinc cathodes, the VAD regime would onset in air at pressure and current values characteristic of the PAGD regime in Argon (cp entry 55 with entry 60), the window of the transition between the NGD and the VAD being rather narrow or absent. Even in Argon, this window remained relatively narrow in terms of its pressure range.

Tubes for pulse generators were also built with apposed cylindrical section electrodes made of silver nitrate directly coated onto the glass inner surface, and having a cross-section fundamentally identical to that of FIG. 4. Because of this geometry, the gap distance given is the average distance between the center and the extremities of the cylindrical electrodes. Experiments with such a device showed that silver in greater thickness would also form a suitable cathode to support PAGD production (entries 64 and 65). The emission loci in silver form single cathode spots for each pulse generated, as with aluminum, tungsten, zinc, nickel and iron cathodes; however, these intermittent silver cathode emitters travel laterally to form quasi-continuous tracks of ejected cathode material.

Lastly, 64 cm2 wide copper and aluminum plates were compared, in entries 66–74 and 61–63, respectively. In the presence of air, under the same pressure, applied voltage and current conditions, copper cathodes do not support PAGD production (unless triggered by external proximity of high-frequency spark gaps, eg a Tesla coil, or a moving static charge, or a moving magnetic field), whereas aluminum cathodes do (cp entries 61 and 66). However, in argon (entries 68, 70–72) or helium (entries 73–74) atmospheres, copper cathodes readily supported PAGD production, though they required greater input currents to attain about half the PAGD frequency observed using aluminum plates. The PAGD region is also particularly narrow with the copper cathodes, when the voltage and current are at threshold levels needed for eliciting the regime (cf entries 68 and 69). It is easy to see the slowing down of the PAGD frequency in these cathodes, apparently due to the rapid heating of their surface (also observed with brass and bronze alloys): the cycle of onset of an abnormal cathode glow, followed by a localized cathode eruption, then by a total or partial collapse of the abnormal glow onto the electrodes and its subsequent re-instatement, slows down progressively as the setting in of the cathode glow becomes more intense in luminosity and finally ceases giving way to the auto-electronic emission. A semi-thermionic abnormal glow discharge then sets in. This transition of the PAGD regime to a semi-thermionic AGD regime, in tubes using copper cathodes, is all the more prevalent as higher frequencies and higher currents are employed to stimulate the pulse generator, and it may explain the observed erratic behaviour of the copper-containing alloys, brass and bronze. Finally, the copper cathode emissions accompanying a single pulse were not single but multiple, and clustered in a neighbourhood, as was also observed in brass and bronze-aluminum alloys.

All the above PAGD cathode emitters that had reasonable characteristics (regular or quasi-regular spontaneous pulse discharges) presented a bell-like distribution for the discharge frequency, with the higher vacua beyond a given pressure having the effect of decreasing the frequency of the PAGD emission, while increasing the input and output peak currents as well as the cathode voltage drop of each pulse. Lastly, caesium emitters were also employed at these input currents to support PAGD production successfully. Other metals considered promising are bismuth, cadmium and antimony.

TABLE 8

| | Cathode Material | Area cm2 | Gas | Pressure in Torr | PPS | Discharge type | gap in cm | VDC | DCA |
|---|---|---|---|---|---|---|---|---|---|
| 1 | Tungsten | 0.5 | Argon | 0.8 | 4 | PAGD | 4 | 750 | 0.2 min. |
| 2 | Tungsten | 0.5 | Argon | 0.5 | 18 | PAGD | 4 | 750 | 0.3 |
| 3 | Aluminum (H34) | 4 | Air | 0.9 | 1 | PAGD | 3 | 564 | 0.2 |
| 4 | Aluminum (H34) | 4 | Argon | 0.9 | 2 | PAGD | 3 | 564 | 0.3 |
| 5 | Aluminum (H34) | 4 | Argon | 0.7 | 1.5 | PAGD | 3 | 564 | 0.4 |
| 6 | Aluminum (H34) | 4 | Argon | 0.4 | 12 | PAGD | 3 | 564 | 0.45 |
| 7 | Aluminum (H34) | 4 | Argon | 0.3 | 0.5 | PAGD | 3 | 564 | 0.5 |
| 8 | Aluminum (H34) | 4 | Argon | 4–0.01 | 0 | None# | 9 | 564 | 0 |
| 9 | Aluminum (H34) | 4 | Argon | 0.9 | 3.5 | PAGD | 9 | 850 | 0.4 min. |
| 10 | Aluminum (R34) | 4 | Argon | 0.4 | 20 | PAGD | 9 | 900 | 0.45 min. |
| 11 | Aluminum (R34) | 4 | Argon | 0.2 | 2 | PAGD | 9 | 950 | 0.5 min. |
| 12 | Aluminum (H34) | 4 | Argon | 0.1 | 1 | PAGD | 9 | 950 | 0.5 min. |
| 13 | Aluminum (H34) | 16 | Argon | 2.0 | 50 | PAGD | 2 | 560 | 0.8 |
| 14 | Aluminum (H34) | 16 | Argon | 0.8 | 100 | PAGD | 2 | 560 | 1.2 |
| 15 | Aluminum (H34) | 16 | Argon | 0.3 | 10 | PAGD | 2 | 560 | 0.4 |
| 16 | Aluminum (H34) | 16 | Argon | 0.3 | erratic | VAD# | 2 | 560 | 1.1 |
| 17 | Aluminum (H34) | 16 | Argon | 1.0 | 20 | PAGD | 2 | 260 | 0.05 min. |
| 18 | Aluminum (H34) | 16 | Argon | 1.0 | 100 | PAGD | 2 | 260 | 0.7 min. |
| 19 | Aluminum (H34) | 16 | Argon | 1.0 | 185 | PAGD | 2 | 260 | 1.6 min. |
| 20 | Aluminum (H34) | 16 | Argon | 0.1 | 2.5 | PAGD | 2 | 350 | 0.03 |
| 21 | Aluminum (H34) | 16 | Air | 0.8 | 0.4 | PAGD | 4 | 560 | 0.3 |
| 22 | Aluminum (H34) | 16 | Air | 0.5 | 20 | PAGD | 4 | 560 | 0.5 |
| 23 | Aluminum (H34) | 16 | Air | 0.3 | 1.2 | PAGD | 4 | 560 | 0.5 |
| 24 | Aluminum (H34) | 16 | Argon | 1.0 | 1.2 | PAGD | 4 | 560 | 0.5 |
| 25 | Aluminum (H34) | 16 | Argon | 0.8 | 30 | PAGD | 4 | 560 | 0.6 |
| 26 | Aluminum (H34) | 16 | Argon | 0.3 | 8 | PAGD | 4 | 560 | 0.7 |
| 27 | Aluminum (H34) | 16 | Argon | 0.8 | 10 | PAGD | 4 | 550 | 0.2 |
| 28 | Aluminum (H34) | 16 | Argon | 0.8 | 52 | PAGD | 4 | 550 | 1.0 |
| 29 | Brass | 16 | Air | 2–0.6 | 0 | None | 4 | 560 | 0 |
| 30 | Brass | 16 | Air | 0.01 | 0.01 | PAGD | 4 | 560 | ND |
| 31 | Brass | 16 | Air | 0.3 | 0.4 | PAGD | 4 | 560 | 0.3 |
| 32 | Brass | 16 | Air | 0.2 | bursts | PAGD# | 4 | 720 | ND |
| 33 | Brass | 16 | Argon | 2–0.3 | 0 | None* | 4 | 560 | 0 |
| 34 | Brass | 16 | Argon | 0.9 | bursts | PAGD# | 4 | 630 | 0.5 min. |
| 35 | Brass | 16 | Argon | 0.8 | ~20 erratic | PAGD | 4 | 750 | 0.7 |
| 36 | Bronze-Aluminum | 16 | Argon | 1 | 0 | None | 4 | 568 | 0 |
| 37 | Bronze-Aluminum | 16 | Argon | 0.5 | 0.4 | PAGD | 4 | 568 | 0.3 |
| 38 | Bronze-Aluminum | 16 | Argon | 0.3 | 0.6 | PAGD | 4 | 568 | 0.3 |
| 39 | Bronze-Aluminum | 16 | Argon | 0.8 | 1 | PAGD# | 4 | 570 | 0.35 |
| 40 | Bronze- | 16 | Argon | 0.8 | 2.8 | PAGD | 4 | 750 | 0.4 |

TABLE 8-continued

| | Cathode Material | Area cm2 | Gas | Pressure in Torr | PPS | Discharge type | gap in cm | VDC DCA |
|---|---|---|---|---|---|---|---|---|
| 41 | Aluminum Bronze-Aluminum | 16 | Air | 0.3 | 5–15 | PAGD# | 4 | 750 0.5 |
| 42 | Iron | 16 | Air | 0.3/0.8 | 0 | PAGD | 4 | 560 0 |
| 43 | Iron | 16 | Air | 0.25/0.18 | 0.2 | PAGD | 4 | 560 0.3 |
| 44 | Iron | 16 | Argon | 0.8 | 0.12 | PAGD | 4 | 560 0.3 |
| 45 | Iron | 16 | Argon | 0.6 | 0.4 | PAGD | 4 | 560 ND |
| 46 | Iron | 16 | Argon | 0.4 | 0 | PAGD | 4 | 560 0 |
| 47 | Iron | 16 | Argon | 2.0 | 3 | PAGD | 4 | 720 0.4 |
| 48 | Iron | 16 | Argon | 1.0 | 1 | PAGD | 4 | 750 0.3 |
| 49 | Iron | 16 | Argon | 1.0 | 26 | PAGD | 4 | 950 1.05 |
| 50 | Iron | 16 | Argon | 0.8 | 0.1 | PAGD | 4 | 720 0.8 |
| 51 | Nickel | 16 | Argon | 2 | 1 | PAGD | 9 | 1000 0.2 |
| 52 | Nickel | 16 | Argon | 1 | 2 | PAGD | 9 | 950 0.3 |
| 53 | Nickel | 16 | Argon | 0.5 | 0.5 | PAGD | 9 | 1000 0.2 |
| 54 | Zinc | 16 | Air | 2–0.8 | 0 | VAD | 4 | 564 1.6–1.3 |
| 55 | Zinc | 16 | Air | 2–0.8 | 0 | VAD | 4 | 564 0.8 |
| 56 | Zinc | 16 | Air | 0.8–0.2 | 0 | th. AGD | 4 | 564 0.03 |
| 57 | Zinc | 16 | Argon | 2–0.8 | 0 | VAD | 4 | 564 1.8–1.2 |
| 58 | Zinc | 16 | Argon | 0.9–0.2 | 0 | th.AGD | 4 | 560 0.1/1000 |
| 59 | Zinc | 16 | Argon | 1.0 | 1 | PAGD | 4 | 560 0.3 |
| 60 | Zinc | 16 | Argon | 1.0 | 23 | PAGD | 4 | 950 1.0 |
| d1 | Aluminum (H34) | 64 | Air | 0.8 | 5 | PAGD | 5.5 | 560 0.4 |
| ~2 | Aluminum (H34) | 64 | Argon | 0.8 | 12 | PAGD | 5.5 | 560 0.5 |
| 63 | Aluminum (R34) | 64 | Argon | 0.8 | 62 | PAGD | 5.5 | 540 0.9 |
| 64 | Silver | 64 | Argon | 0.8 | 10 | PAGD | 5.5 | 560 0.2 |
| 65 | Silver | 64 | Argon | 0.2 | 1.2 | PAGD | 5.5 | 560 0.7 |
| 66 | Copper | 64 | Air | 4–0.01 | 0 | None* | 5.5 | 560 mD |
| 67 | Copper | 64 | Argon | 4–0.4 | 0 | None* | 5.5 | 560 ND |
| 68 | Copper | 64 | Argon | 0.3 | 0.44 | PAGD# | 5.5 | 560 0.5 |
| 69 | Copper | 64 | Argon | 0.25 | 0 | Th. AGD | 5.5 | 560 0 |
| 70 | Copper | 64 | Argon | 0.8 | 5 | PAGD | 5.5 | 580 0.2 min. |
| 71 | Copper | 64 | Argon | 0.8 | 33 | PAGD | 5.5 | 580 0.9 |
| 72 | Copper | 64 | Argon | 0.1 | 1 | PAGD | 5.5 | 900 0.5 min. |
| 73 | Copper | 64 | Helium | 0.9 | 0 | None * | 5.5 | 560 0 |
| 74 | Copper | 64 | Helium | 0.2 | 0.5 | PAGD | 5.5 | 560 0.7 min. |
| 75 | Brass | 64 | Argon | 4–0.6 | 0 | None * | 4 | 560 0 |
| 76 | Brass | 64 | Argon | 0.5 | 0.2 | PAGD | 4 | 560 0.3 |

*Single pulses of abnormal glow discharge could be elicited by moving static charges or the proximity of high frequency alternating currents.
PAGD production was erratic.

Shaping of the cathode is not critical, although it should be such as to provide a reasonably uniform distance between different parts of its surface and the anode. Cylindrical or multiple part cylindrical electrodes may conveniently be used with rod anodes, or a flat cathode when the anode is a flat plate or mesh, or the electrode separation is large. Walls of the discharge tube should be sufficiently spaced from the electrodes that metal sputtered from the cathode does not build up a path for arcing or act as an auxiliary electrode modifying the characteristics of the tube.

The static and dynamic characteristics of the external circuit which cooperates with the tube must be such as to prevent the plasma eruptions from the cathode during PAGD from acquiring sufficient energy to reach the anode and forming a continuous VAD channel. This involves inter alia the physical dimensions of the tube, its gas content, the impedance of the supply and any associated ballast resistor, and the energy storage capacity of any reactive components in the pulse generator circuit, such that the potential across the tube falls below the AGD extinction potential before a plasma channel to the anode is established. Although it may be possible to acieve this with a very small cathode area or small interelectrode gap, the amounts of energy involved in creating the plasma eruptions and released by their collapse will likely become too small to be useful.

In conclusion, we have developed a series of pulse generators exploiting the abnormal glow discharge regime, as well as a series of low to very high vacuum discharge tubes which support the production of PAGDs. In testing these devices we have shown that:

the low field strengths and typical low emission current densities observed in the PAGD regime are not predicted by any existing field emission or space-charge theories;

the PAGD regime responds asymmetrically to the polarity of the applied voltage at high applied currents;

at low applied currents, the PAGD pulse rate increases with the applied voltage and the current up to an observed plateau;

at mid to high applied currents, the PAGD pulse rate increases with an increase in current and with a lowering of the extinction potential;

the PAGD pulse rate also varies with the composition of the cathode material (the pulse rate is promoted by materials having a low work function) and increases with a decrease in pressure, during pumpdown, to a maximal peak rate, thereafter either diminishing to the point at which the discharge extinguishes or gives way to x-ray production (depending on the magnitude of the applied potential);

larger area plates lower the field strength values needed to elicit comparable PAGD production, displace the PAGD region downward in the pressure scale and increase the peak PAGD rate;

higher power supply capacitances slow down the PAGD rate.

Exploitation of PAGD permits the production of highly efficient pulse generators for the production of endogenously generated abnormal glow discharge pulses triggered by intense, cathodic auto-electronic emissions under conditions of a constantly applied DC potential.

These pulse generators have diverse industrial applications; directly, they may be used as stroboscopic light sources, for vacuum deposition of cathode materials or cathode coatings (eg. polymer deposition or aluminum mirroring of target surfaces), detection of ionizing radiation fields, or electrostatic and electromagnetic proximity fields, high power noise-signal generation, destructive component testing (transient response) or destructive testing of materials in vacua (eg. insulations), high frequency medium voltage power supply applications (switching supplies and inverters), as an oscillator or as part of a pulse forming network. Indirectly, they may be used for laser pulsing, flash tube pulsing or for research (eg. chemical reaction triggering) and industrial switching applications.

Average Electrode Current Densities

Table 9 shows additional data related to that of Example 5 and Table 6. In Table 9, columns A through G are the same as in Table 6 for ease of reference. Current densities (Table 9, columns I and M) for the overall electrode areas employed were determined experimentally and compared to the values predicted on the basis of the glow discharge theory (Table 9, columns H and L), under the same conditions and with the same devices as described in Example 5. As explained above in Example 5, and given a linear factor $k_L$, two vacuum tubes "a" and "b", will have the same breakdown voltage if the pressure of "b" decreases by $1/k_L$, with the result that J (the average electrode current density) should decrease by $1/k_L 2$ while $J/p^2$ should remain constant (if the pressure varies). Predicted and experimentally determined $J/p^2$ values are shown in columns J and K of Table 9. Essentially, as the area factor between the two pulse generators is $k_A=k_L2$, both the charge density r and the current density J should change by $1/k_L2=1/k_A$, ie. inversely to the plate area factor $k_A$. This is indeed what is observed at breakdown (Vb), for invariant pressure groups 5 and 6, columns H to K, Table 9. The same relation however does not apply as a function of the maximum input power and lowest sustaining or extinction voltages (columns L to O, Table 1), respectively, 676 and 368 V, as the plate current density and $J/p^2$ values of the same groups 5 and 6 are virtually identical, despite the invariant pressure and the $k_A=k_L2$ area factor between the two pulse generators.

Examples of typical average electrode current densities encountered in the PAGD regime are shown in Table 10 for different area aluminum plates, as a function of the input current. Electrode J values vary from $10^{-2}$ A/m² to $10^3$ A/m².

Emission Structure, Area and Current Densities

Determination of the videographed equatorial diameter of the inner core of the cathode plasma ball at the base of each PAGD channel allowed us to approximate grossly the emission area per pulse and the pulse current density at the emitter surface, utilizing a reactor (#1 of Table 1) built with H34 aluminum plates. Measurements were taken laterally from the extreme infra-red light component alone of the pulsed abnormal discharges at fully closed aperture.

At PAGD breakdown voltages (Vb) of 1100 to 1350, the mean equatorial area of the cathode plasma globule was 2.8± 0.03 mm². At PAGD plateau breakdown (Vb) voltages of 700 to 850 volts, the mean equatorial area of the cathode PAGD plasma globules were 3.8 and 0.95 mm² with anode and cathode voltages respectively (#4 and 2, Table 11). As indicated by the input current progression of groups 2 to 5, the mean equatorial area of the cathode plasma globule increases with increasing input current (cf columns B and C, Table 11). Group 6, Table 11 shows similar results for an Alzak cathode. This Videographic determination of the mean equatorial area of the cathode plasma globule allowed an estimation of the overall emission area, and thus the calculation of (uncorrected) emission current densities ($J_{cm}$), shown in column D, Table 11.

Autographic analysis of the PAGD-induced cathode craters in Alzak plates was performed next, and their aspect, average inner diameter and maximal depth were determined (device 2 of Table 1) after 30 seconds of operation at 500 PPS, Only isolated craters were measured, following the autograph method of Daalder (Daalder, J. E. (1974) "Diameter and current density of single and multiple cathode discharges in vacuum", IEEE Trans Power Appar Syst, PAS-93:1747). The PAGD operation, at levels where Vb and Vx were very close, showed a discharge that, despite the smoothness of the surface, tended to move over most of the cathode, with the highest concentration of emission craters found at the lateral edges. After PAGD operation, two types and sizes of craters could be observed:

1) the large type, or primary craters, which had an average inner diameter of 0.28±0.03 mm and a mean area of 0.000615±SE 7*10⁻⁵ cm², see group 9, Table 11;

2) smaller pits, typically distributed radially around a major crater or a cluster of these, and which have a mean diameter of 5.5 µm.

The primary craters often occur in discrete clusters of 2 to >10 such craters, defining surface neighbourhood regions of PAGD emission where the discharge repetitively struck. The inner or bottom circular area of the primary craters characteristically shows a twirl or swirling pattern of molten metal along one of its diameters with solidified metal droplets scattered about. Gross macroscopic examination of these craters exhibits a whitish periphery.

A comparison of the emission area values obtained by the autographic method of crater size determination and the videographic method of measuring the equatorial cathode ball diameter, indicates a substantial divergence between them, and the resultant estimation of the current density at the primary emission site. The reason for the discrepancy between the two methods appears to be due to the emission structure encountered micrographically: even though measurements of the luminous emission globules did not include the zones of less intense luminosity (the fringe), metallographic examination showed that each focus of emission had a multiplicity of minor emission craters associated with it; these secondary craters were dispersed in a radius of three to four primary crater diameters from the primary crater's center, and they thereby increased the total area involved in associated emission to an average of 0.037 cm². This corresponds rather well to the obtained videographic value of an area of 0.044 cm$^2$ for the cathode plasma globules in Alzak plates, (group 6 of Table 11) as measured on the cathode that was later disassembled for autographic analysis. Typically, the videographic method over estimates the area of primary emission site by 62 to 88×. The two methods thus identify distinct structures of the emission process: whereas the metallographic method identifies primary emission sites, the videographic method identifies the overall area of the emission complex which includes the secondary craters associated with the primary emission site. Due to these findings, and based upon the metallographic measurements, a general correction factor of 75× was applied to determine the PAGD emission areas and current densities at the primary emission site measured videographically, as shown in group #'s 1 to 6, columns F to H, Table 11. These values correspond well with the values obtained, for the same type of plate material, by the metallographic method (compare for example group 6 with group 9), to the advantage of the videographic method which does not require disassembly of the reactor. With this approach, PAGD primary emission site current densities as low as 1 to 2.5*10$^5$ have been measured.

Autographic analysis of the PAGD-induced cathode craters in H34 plates was equally performed, and their average inner diameter and maximal depth determined, examples of which are given in groups 7 and 8, Table 11. The secondary craters characteristically found in Alzak plates, along fracture lines radiating from the main crater, are absent in H34 plates; instead, in H34 plates, one observes a roughened surface surrounding the emission crater, quite distinct from the original rough aspect of the pulled finish of these hardened aluminum plates. Also unlike the Alzak main craters, the H34 craters often have a convex center occupied by a cooled molten metal droplet, whereas the Alzak craters had a concave, hollowed out aspect.

With the data obtained by the metallographic method of crater measurement, we estimated the volume of metal ejected from the cathode, by assuming that the crater represents a concavity analogous to a spherical segment having a single base ($\frac{1}{6}\pi$*H [3r$^2$+H$^2$], where H is the height of the spherical segment and r the radius of the sphere), while disregarding the volume of the central droplet leftover from the emission. The following are mean crater diameters (D), crater depths (H) and volumes (V) of ejected metallic material for two types of aluminum cathodes, Alzak and H34 hardened aluminum, subject to a high input current PAGD:

1—Alzak:D-0.028 cm±0.003; H-0.002 cm±0.0002; V-6.2*10$^{-7}$cm$^3$;

2—H34:D-0.0115 cm±0.0004; H-0.0006±0.0001; V-3.1*10$^{-8}$cm$^3$;

These data indicate that, on the basis of the input currents, the PAGD reactors do not reach the critical value of about 7*10$^8$ A/m$^2$ ie the threshold required by the Fowler-Nordheim theory for field emission. Nonetheless, auto-electronic emission is occurring, at low applied fields and low emission current densities. Based on measurements of the peak pulse current developed by the reactor, there is an anomalous reaction current set up within the reactor. This is exemplified in FIG. 18B. These anomalous reaction currents may be as low as 100 mA but, under conditions of most interest, are of the order of 0.5 to >200 A. On the basis of this anomalous reaction current phenomenon, primary emission current densities of the order of 10$^7$ to 10$^9$ A/m$^2$ can be calculated.

Low Field Emission

Unlike prior art planar or coaxial electrode discharge devices (eg Boetcher, U.S. Pat. No. 3,663,855; Conrad, U.S. Pat. No. 4,764,394; Alexandrovich, et al, U.S. Pat. No. 3,821,580; Dethlefsen, U.S. Pat. No. 5,126,638), which utilize short gap and high field primary or trigger discharges (typically >100,000 V/m), the PAGD reactors are essentially low breakdown field devices with long gaps, and which advantageously employ the area effect to reduce the field strength, as described previously with reference to FIG. 11. Typical examples of the values of the PAGD breakdown fields at various negative pressures, for aluminum and nickel cathodes of reactors that were sealed (at diffusion pump vacua) or pumped down (by rotary pump action), are shown in Table 12. The breakdown field values mostly range from 5,000 to about 30,000 V/m. Similar ranges are shown in FIG. 11 where PAGD breakdown fields can be seen to vary from a minimum of 2,730–5,090 V/m to a maximum of 15,640 V/m. (Extinction field values may be as low as 1,000 to 2,000 V/m.) As previously discussed, the breakdown field value is modulated by the voltage reduction area effect, the interelectrode gap distance and the residual gas pressure in the gap. Generally, increasing the gap distance increases the required field strength. The voltage reduction effect of large area electrodes appears to be mainly responsible for the low field breakdown characteristics of the self-generating autoelectronic emissions encountered in the PAGD regime. Field-emission theory typically requires a very high breakdown field value, greater than 2*10$^9$ V/m, for auto-electronic emission (eg in a VAD). Disregarding momentarily the fact that the PAGD has a positive I/V$^2$ slope and taking its cathode- or anode-supplied voltage intercepts (0.0005 and 0.00005, respectively) to calculate the field-enhancement factor β required by the field-emission theory to explain the unpredicted auto-electronic emissions observed in the PAGD regime, we end up with β values of the order of 10$^6$ to 10$^7$ (for actual fields of 15,000 V/m), if we were to assume, incorrectly, that the long gap PAGD operates like a (short-gap) VAD. Indeed, what is remarkable about the PAGD regime in these reactors is the very low (>10$^5$-fold lower) values of the fields required for the PAGD transduction of high current densities, a phenomenon that actually occurs during known VAD regimes (cold cathode or thermionic), but typically only at 10$^2$-fold lower values than those required and predicted by the field-emission theory (Farrail, G. A. (1980) "Electrical breakdown in vacuum", in 'Vacuum arcs, theory and application', Lafferty, J. M., ed., p 20 & f, J. Wiley & Sons, N.Y., N.Y.).

Pulse Input Energy

Pulse input energy was determined for a variety of conditions (pressure, gap, electrode area, residual gas, input current and input voltage, duration of input pulse, cathode material, etc) and typical examples are presented in Table 13. In the PAGD regime, input pulse duration and corresponding duty cycle are self-regulated events dependent upon the frequency controlling factors already discussed, and thus the input pulse times shown in Table 13 are spontaneous and not externally determined, as would be the case for interrupted vacuum-arc discharges (IVADs). As a function of the input power characteristics, input energy per pulse in the PAGD regime ranged from as low as 1 mJ to >112 J (Table 13). Values as high as 250 J/PAGD input energy have been determined without slippage to a VAD regime for typical 5–8 cm gap, 4 to 128 cm$^2$ plate reactors. Under the same conditions, higher values will promote slippage of the PAGD into the VAD regime. However, higher values should be possible with still larger electrode spacing and higher input currents (eg 4 to 10 A).

Reactor Pulse Energy

Typical input, reactor and output energies per pulse, respectively, columns A to C, ordered vertically by increasing input energy, are shown in Table 14. The data was obtained with plate reactors of 4 to 128 cm² cathode areas, gaps of 5 to 8 cm, at different pressures (in air or argon) and PPS rates of 0.1 to 110 (column D, Table 14). Two separate types of associated circuits were utilized to measure the output energy per pulse (column C, Table 14):

1) In a double diode configuration, oscillographic reactor measurements for groups 1 to 3, Table 6, were taken at the junctions of the cathodes with capacitors 10a and 10b (FIG. 21A), and at the junction of the axial anode with another capacitor placed prior to the center tap of transformer 26, in series with both parallel capacitors 10a and 10b. Coils 26a and 26b of transformer 26 were replaced by a third series capacitor intermediate parallel capacitors 10a and 10b, and oscillographic AC output readings taken across this capacitor (groups 1 to 3, Table 14); the total series capacitance was 5.3 µF.

2) In a single diode configuration, oscillographic reactor measurements for groups 4 to 14, Table 6, were taken at the junctions of the cathode with capacitor C3, and of the anode with capacitor C5 (see FIG. 9 of our copending U.S. application No. 08/054,111 entitled "Energy Conversion System"), and oscillographic or long-term DC output readings were determined at the input to the battery pack CP; the C3/C5 series capacitance was 17.5 mF.

Two conclusions, independently from all other varying conditions, may be taken from the data of Table 14: the pulse energy released within the reactor varies from <3 to >50× the input energy per pulse (column A vs columns B and C); and, in general, the reactor energy varies inversely to the pulse frequency (columns B and C, vs column D). In other experiments, reactor energies per pulse have been observed to reach >500 J. Given that the reactor pulse voltage (Vp) is determined by the extinction voltage Vx (Vp=Vb–Vx) and thus cannot reach the amplitude of the breakdown voltage Vb, this involution of energy observed per pulse in the reactor and at its output indicates that it is a current amplification phenomenon. Indeed, with input currents of 1.2 to 1.7 A and input pulse energies of 1 to 30 J, peak pulse reactor currents have been observed to reach >150 A.

Dynamic Capacitance of PAGD Reactors

The static capacitance of typical reactors has been discussed in Example 6. A typical 128 cm² plate reactor would have a capacitance of the order of 2 pF, and at an applied 560 V potential, be capable of storing 0.3 micro-Joules, an infinitesimal quantity of energy (E=0.5 C V², where E is in Joules, C in Farads and V in Volts). With a typical pulse input energy injection of 5 to 15 J, the reactor will develop 25 to >400 J per pulse; under these conditions at pulse reactor voltages (Vp) of 100 to 500, the dynamic capacitance of the discharge tube will range from 0.2 to 80 mF.

Anomalous Reaction Forces in the PAGD Regime

Determinations of the anomalous cathode reaction forces in the PAGD regime was carried out utilizing the reactor pulse energy or the pulse output energy, together with the metallographic data or by measuring the force in a reaction balance. The kinetic energy of each pulse was determined either directly, by integration of oscilloscopic pulse profiles, or indirectly, by long-term resistive discharge measurements of the batteries storing output power. The cathode material utilized for these experiments had a density of 1.86 g/cm³. For a mean net pulse output energy of 86.4 J (Net energy out=output reactor energy–input reactor energy), or 24 mWh, and a mean volume of cathode metal ejected of the order of 3.1*10⁻⁸cm³, a single PAGD releases 5.8*10⁻⁸g of metal in 40 to 50 msec, or 1.3*10¹⁵ Al ions. Accordingly, the calculated kinetic energy of each Al ion leaving the cathode is quite high, of the order of 4.8*10⁵eV, more than three orders of magnitude that typically found in VADs (Tanberg, R (1930) "On the cathode of an arc drawn in vacuum", Phys Rev, 35:1080; Kobel, E (1930) "Pressure and high vapour jets at the cathodes of a mercury vacuum arc", Phys Rev, 36:707; Plyutto, A. A. et al (1965) "High speed plasma streams in vacuum arcs", Sov Phys J Exp Theor Phys, 20:328). Under these conditions of PAGD production and measurement, the energy density of the Al cathode being operated in a PAGD reactor, is of the order of 2.8*10⁹ J/cm³, only three orders of magnitude less than the energy density value of the energy priming the vacuum, as calculated by Aspden ("Gravitation", 1975 p.61). Corresponding rms vapor velocity of the ejected Al ions was 1.7*10⁸cm/sec. Utilizing Tanberg's formula for the reaction force $F_R$ in dynes ($F_R$=m*V/1.39), such a typical PAGD deploys an anomalous reaction force of 143.6 dynes. Determination of the anomalous ion force by reaction weight measurement, under similar conditions, yielded 245.2 dynes. Anomalous cathode reaction forces >300 dynes have been observed in other PAGD experiments (with pulse output energies of 25 to >100 mWh).

In referring to the anomalous reaction forces present in VADs (Tanberg's and Kobel's work), Aspden has suggested a proportionality of the order of 100*i² (where i is input current in real units), for the electrodynamic action observed in these experiments (Aspden, H (1969) "The law of electrodynamics", J Franklin Inst, 287:197). Graneau et al (Graneau, P & Graneau, P. N. (1985) "Electrodynamic explosions in liquids", Appl Phys Lett, 46:470; Azevedo, R et al (1986) "Powerful water-plasma explosions", Phys Lett A, 117:101), in their calculation of the average acceleration force for water-plasma arcs ($F_{av}=(\mu_o/4\pi)(k*i^2)$, where $\mu_o$ is the permeability constant of the vacuum in Henrys per meter, and the force is in Newtons) have utilized k as a figure of merit for the strength of the explosions observed. As may be seen from Table 15, the k values of the PAGD are very high (100× higher than those observed in VAD studies, compare VAD groups 1 to 3 with PAGD groups 6 and 7, Table 15), and are comparable to those calculated by Graneau et al for water-plasma arc explosions. Yet, the PAGD input current values are the lowest of all groups. Following Aspden's interpretation of the law of electrodynamic action, the PAGD k values are found to be in the range prescribed by the ion/electron mass differential for Al ions (49,185), which lies in the 10⁴ range.

Work-function of Cathode Material

Based upon data for the PAGD performance of diverse cathode materials presented above in Table 8, together with Pauling's tabulation of element electronegativities (Electronegativity X=0.44ø–0.15, where ø is the work-function of the element (Lange's Handbook of Chemistry", 1979 McGraw-Hill Book Co, N.Y., N.Y., p 3–11)), we determined the PAGD affinity of diverse cathodes to decrease with increasing element electronegativity (C) and cathode work-function (ø), as shown in Table 16. The lower the work-function of the cathode metal utilized, the greater is the observed PAGD affinity. It is expected that materials with work-functions of <1.5, such as Li, Be, Mg, Cs, etc, will support PAGD production better than Al does. Tungsten (W) was the only material tested not in plates but in thin rods. No correlation of PAGD production affinity with any other physical parameters considered (eg atomic electron affinities, ionization potentials, atomic weight, density, melting and boiling points, thermal conductivity and electrical resistivity) was found, except that the two best PAGD cathode emitters had the lowest melting points and densities of all cathodes examined.

Typical Expected Cathode Lifetimes

Utilizing plates composed of either hardened aluminum or Alzak material with 3 mm of thickness, and thus with a volume of 38.4 cm$^3$ per plate and considering that only ⅔rds of the cathode shall be used (a 2 mm layer out of the 3 mm thickness), the total number of pulses per plate total (TLT) and partial (PLT) lifetimes is theoretically:

1—Alzak: TLT: 6.2*10$^7$ pulses; PLT: 4.1*10$^7$ pulses;

2—H34: TLT: 1.2*10$^9$ pulses; PLT: 8.1*10$^8$ pulses;

Typically, a H34 device can produce about 0.25 kWh per 10,000 pulses. The corresponding value for a PLT is thus a minimum of 1.0 MWh/Alzak cathode and of 20 MWh/H34 cathode. As the cathode for each combination is only 66.7% consumed, the vacuum pulse generator may continue to be used in a reverse configuration, by utilizing the other plate in turn as the cathode; thus, the minimal values become, respectively, 2.0 MWh/Alzak pulse generator and 40 MWh/H34 pulse generator. The same rationale applies if the configuration utilized was that of the double diode.

A summary of the typical specifications of PAGD reactors is presented in Table 17, though its values should not be construed as limits to the phenomenon such as it might manifest itself in other conditions.

Unlike other discharge tubes in prior art (eg Manuel, U.S. Pat. No. 3,471,316; Boetcher, U.S. Pat. No. 3,663,855; Conrad, U.S. Pat. No. 4,764,394; Alexandrovich, et al, U.S. Pat. No. 3,821,580; Dethlefsen, U.S. Pat. No. 5,126,638), which must be triggered by an external pulse generator, the PAGD reactor is the oscillator component in any of the pulse generator circuits discussed. Essentially, the PAGD reactor is a low breakdown field oscillator that does not require a trigger electrode, nor any external shaping of the applied current or voltage, which is simply DC. In distinction from the externally pulsed abnormal glow discharge described by Manuel in U.S. Pat. No. 3,471,316, the PAGD regime is a self-pulsed or self-generated, and self-regulated discharge method. In fact, with the appropriate input resistance, a PAGD reactor, as described, will operate in the PAGD regime autogenously, in the absence of any parallel capacitance, and utilizing a battery pack as a power source. This application describes the physical and operational parameters necessary to configure a vacuum discharge tube to elicit self-generating discharges, and thus be self-pulsed, in the PAGD plasma regime, directly from a direct current supply.

Unlike prior art glow discharge tubes that are fundamentally flash over devices that do not employ any form of emission (eg Manuel, U.S. Pat. No. 3,471,316; Conrad, U.S. Pat. No. 4,764,394), the discharge has both a glow and auto-electronic emission components. Unlike VAD tubes (eg Boetcher, U.S. Pat. No. 3,663,855; Alexandrovich, et al, U.S. Pat. No. 3,821,580), the cold cathode PAGD auto-electronic emission pulse is not triggered externally, but a spontaneous occurrence observed at low breakdown fields, with emitter current densities 10 to 1000× lower than those required by the Fowler-Nordheim theory for field emission.

As already observed in prior art VAD devices (eg Tanberg's or Kobel's papers referenced above), anomalous cathode reaction forces are set up in the PAGD reactors; however, with input currents one or two orders of magnitude less than needed for a VAD, the PAGD-associated reaction forces manifest a proportionality constant that is 10 to 100 times higher than found for VADS ($10^3$ to $10^4 * i^2$ vs $10^2 * i^2$). These forces may account for the low input current densities observed in the PAGD regime. Evidently, as with the PAGD regime itself, these reaction forces result from the specific physical and operational parameters employed, amongst which the large gaps, large electrode areas, cold cathode status, cathode low worth function and low breakdown fields figure prominently.

TABLE 9

| No. | A<br>W<br>(cm) | B<br>L<br>(cm) | C<br>Plate<br>($K_L$) | D<br>Area<br>(cm$^2$) | E<br>$K_A$ | F<br>d<br>(cm) | G<br>p<br>(Torr) |
|---|---|---|---|---|---|---|---|
| 1 | 16 | 4 | 1    | 64  | 1 | 3.6 | 2.8 * 10$^6$ |
| 2 | 32 | 4 | 1.41 | 128 | 2 | 5   | 2.0 * 10$^6$ |
| 3 | 32 | 8 | 1.41 | 256 | 2 | 7   | 1.4 * 10$^6$ |
| 4 | 16 | 4 | 1    | 64  | 1 | 5   | 2 * 10$^6$ |
| 5 | 32 | 4 | 1.41 | 128 | 2 | 5   | 2 * 10$^6$ |
| 6 | 32 | 8 | 1.41 | 256 | 2 | 5   | 2 * 10$^6$ |

| No. | H<br>J (plate)<br>(A/m$^2$)<br>Predic | I<br>J (plate)<br>Exptl<br>@ Vb | I<br>J/p$^2$<br>Predict | K<br>J/p$^2$<br>Exptl<br>@ Vb | L<br>J (plate)<br>(A/m$^2$) | M<br>J (plate)<br>Exptl<br>@ max | N<br>J/p$^2$<br>Predict | O<br>J/p$^2$<br>Exptl<br>@ max |
|---|---|---|---|---|---|---|---|---|
| 1 | 17.7 | 0    | 2.2 * 10$^{12}$ | 0               | 41.4  | 0     | 5.2 * 10$^{13}$ | 0 |
| 2 | 8.8  | 8.8  | 2.2 * 10$^{12}$ | 2.2 * 10$^{12}$ | 20.7  | 20.7  | 5.2 * 10$^{12}$ | 5.2 × 10$^{12}$ |
| 3 | 4.4  | ND   | 2.2 * 10$^{12}$ | ND              | 10.35 | ND    | 5.2 * 10$^{12}$ | ND |
| 4 | 17.7 | 0    | 4.4 * 10$^{12}$ | 0               | 41.4  | 0     | 1.4 * 10$^{13}$ | 0 |
| 5 | 8.8  | 8.8  | 2.2 * 10$^{12}$ | 2.2 * 10$^{12}$ | 20.7  | 20.7  | 5.2 * 10$^{12}$ | 5.2 × 10$^{12}$ |
| 6 | 4.4  | 4.38 | 1.1 * 10$^{12}$ | 1.1 * 10$^{12}$ | 10.35 | 19.53 | 2.6 * 10$^{12}$ | 4.9 × 10$^{12}$ |

NA = Not Applicable
ND = Not Determined

TABLE 10

| No. | A<br>Area<br>(cm$^2$) | B<br>I rms<br>Input | C2<br>J (plate)<br>(A/m$^2$) |
|---|---|---|---|
| 1 | 256 | 1.7   | 66.4 |
| 2 | 128 | 0.001 | 0.078 |
| 3 | 128 | 0.112 | 7.8 |
| 4 | 128 | 2.0   | 156.25 |
| 5 | 64  | 2.0   | 312.5 |
| 6 | 16  | 2.0   | 1,250 |
| 7 | 4   | 2.0   | 5,000 |

TABLE 11

| No. | A Area (cm$^2$) | B I rms Input (A) | C X-section area of plasma ball (cm$^2$) | D Uncorr J (em) (A/m$^2$) | E Method | E Emission area (cm$^2$) | G J (em) (A/m$^2$) | H Method |
|---|---|---|---|---|---|---|---|---|
| 1 | 256 | 0.500 | 0.0333 | 1.2 * 10$^5$ | Videog; uncorr | 4.4 * 10$^{-4}$ | 9 * 10$^6$ | Videog; corr |
| 2 | 128 | 0.119 | 0.0095 | 1.25 * 10$^5$ | Videog; uncorr | 1.3 * 10$^{-4}$ | 9.5 * 10$^6$ | Videog; corr |
| 3 | 128 | 0.265 | 0.0177 | 1.5 * 10$^5$ | Videog; uncorr | 2.4 * 10$^{-4}$ | 1.1 * 10$^7$ | Videog; corr |
| 4 | 128 | 0.500 | 0.038 | 1.3 * 10$^5$ | Videog; uncorr | 5.1 * 10$^{-4}$ | 9.8 * 10$^6$ | Videog; corr |
| 5 | 128 | 1.030 | 0.0303 | 3.4 * 10$^5$ | Videog; uncorr | 4.4 * 10$^{-4}$ | 2.6 * 10$^7$ | Videog; corr |
| 6 | 128 | 0.500 | 0.044 | 1.1 * 10$^5$ | NA | 5.9 * 10$^{-4}$ | 8.5 * 10$^6$ | Videog; corr |
| 7 | 128 | 0.500 | ND | NA | NA | 1.04 * 10$^{-4}$ | 4.8 * 10$^7$ | Metallog |
| 8 | 128 | 0.100 | ND | NA | NA | 3 * 10$^{-4}$ | 3.3 * 10$^6$ | Metallog |
| 9 | 128 | 0.500 | ND | NA | NA | 6.2 * 10$^{-4}$ | 6.5 * 10$^6$ | Metallog |

TABLE 12

| No. | A Area (cm$^2$) | B Gap (cm) | C Vb (Volts) | D E @ Vb (V/m) | E Torr | F Residual Gas | G Status | H Cathode material |
|---|---|---|---|---|---|---|---|---|
| 1 | 256 | 5 | 278 | 5,560 | 2 * 10$^{-6}$ | Ar | Sealed | H.Al. |
| 2 | 128 | 5 | 774 | 15,480 | 2 * 10$^{-6}$ | Ar | Sealed | H.Al. |
| 3 | 128 | 5 | 3500 | 70,000 | 6 * 10$^{-4}$ | Ar | Rotary Pump | H.Al. |
| 4 | 128 | 5 | 1600 | 32,000 | 9 * 10$^{-4}$ | Ar | Rotary Pump | H.Al. |
| 5 | 128 | 5 | 560 | 12,200 | 4 * 10$^{-3}$ | Ar | Rotary Pump | H.Al. |
| 6 | 128 | 5 | 300 | 6,000 | 8 * 10$^{-2}$ | Ar | Rotary Pump | H.Al. |
| 7 | 128 | 5.5 | 1350 | 24,545 | 1 * 10$^{-3}$ | Ar | Rotary Pump | H.Al. |
| 8 | 16 | 4 | 560 | 14,000 | 5 * 10$^{-2}$ | Ar | Rotary Pump | H.Al. |
| 9 | 4 | 8 | 560 | 7,000 | 2 * 10$^{-1}$ | Ar | Rotary Pump | H.Al. |
| 10 | 10 | 9 | 900 | 10,000 | 1 * 10$^{-4}$ | Air | Sealed | Ni |
| 11 | 10 | 18 | 1500 | 8,333 | 1 * 10$^{-4}$ | Air | Sealed | Ni |

TABLE 13

| No. | A Volts | B Input Current (A) | C Pulse Time (msec) | D Input Energy per Pulse (Joules) |
|---|---|---|---|---|
| 1 | 3,500 | 0.010 | 0.5 | 1.8 * 10$^{-2}$ |
| 2 | 1,020 | 0.001 | 1 | 1 * 10$^{-3}$ |
| 3 | 600 | 0.100 | 6 | 3.6 * 10$^{-1}$ |
| 4 | 560 | 0.500 | 20 | 5.60 |
| 5 | 560 | 1.700 | 3 | 2.85 |
| 6 | 560 | 1.700 | 30 | 28.56 |
| 7 | 560 | 1.200 | 48 | 32.26 |
| 8 | 560 | 4.000 | 50 | 112.00 |
| 9 | 250 | 0.500 | 80 | 10 |
| 10 | 250 | 1.100 | 20 | 5.5 |

TABLE 14

| No. | A Input Energy per pulse (Joules) | B Reactor Energy per pulse (Joules) | C Output Energy per pulse (Joules) | D PPS |
|---|---|---|---|---|
| 1 | 0.1 | 0.3/0.5 | 0.16/0.2 | 60 |
| 2 | 0.33 | 1 | 1 | 60 |
| 3 | 0.38 | 2 | 2 | 60 |
| 4 | 1.84 | ND | 2.8 | 110 |
| 5 | 2 | ND | 121 | 0.2 |
| 6 | 4.3 | ND | 20.2 | 8 |
| 7 | 5.6 | ND | 154.5 | 0.2 |
| 8 | 6.5 | 367.7 | 353.8 | 0.2 |
| 9 | 8 | 71.5 | 25.2 | 1 |
| 10 | 14.4 | ND | 99 | 1 |
| 11 | 22.2 | ND | 72.9 | 0.8 |
| 12 | 26.8 | ND | 50 | 8 |
| 13 | 38.2 | ND | 80.3 | 1.5 |
| 14 | 44.8 | 261.5 | 253.5 | 0.3 |

TABLE 15

| No. | A Current i in A | B $i^2$ | C $F_R$ in dynes | D $ki^2$ | E k | F Proportionality | G Source |
|---|---|---|---|---|---|---|---|
| 1 | 16 | 256 | 258.6 | 25,800 | 100.8 | $10^2 i^2$ | Tanberg |
| 2 | 19 | 361 | 356.1 | 35,609 | 98.6 | $10^2 i^2$ | Tanberg |
| 3 | 35 | 1,225 | 1,470 | 147,000 | 120 | $10^2 i^2$ | Kobel |
| 4 | 12,700 | $1.6 * 10^8$ | $0.9 * 10^{11}$ | $9.4 * 10^{11}$ | $5.8 * 10^3$ | $5 * 10^3 i^2$ | Graneau |
| 5 | 25,400 | $6.5 * 10^8$ | $4.3 * 10^{10}$ | $4.3 * 10^{12}$ | $6.6 * 10^3$ | $7 * 10^3 i^2$ | Graneau |
| 6 | 1.6 | 2.56 | 143.6 | 14,359 | $5.6 * 10^3$ | $6 * 10^3 i^2$ | PAGD |
| 7 | 1.6 | 2.56 | 245.2 | 24,516 | $9.6 * 10^3$ | $10^4 i^2$ | PAGD |

TABLE 16

| No. | A Element | B relative PAGD affinity | C Electro-negativity $X = 0.44\phi - 0.15$ | D Work function $\phi$ (eV) |
|---|---|---|---|---|
| 1 | Al | +++++ | 1.5 | 3.75 |
| 2 | Zn | +++++ | 1.6 | 3.98 |
| 3 | W | ++++ | 1.7 | 4.20 |
| 4 | Ni | ++++ | 1.8 | 4.43 |
| 5 | Fe | +++ | 1.8 | 4.43 |
| 6 | Ag | +++ | 1.9 | 4.66 |
| 7 | Cu | + | Cu (I) 1.9 | 4.66 |
|   |   |   | Cu (II) 2.2 | 4.89 |

TABLE 17

| | |
|---|---|
| Gas fill | Air, Nitrogen, Inert gas |
| Gas pressure, Torr | 1 to $10^{-6}$ |
| Interelectrode distance | 2.0 to >20 cm |
| Electrode Geometry | Planar-parallel, hemi-cylindrical and co-axial |
| Cathode area | >2 cm$^2$ |
| Electronegativity of cathode material | <1.0 to 2.2 |
| Cathode work-function | <3.5 to 5.6 eV |
| Breakdown voltage | 200 to 5,000 V |
| Breakdown fields | 2,500 to >50,000 |
| Current consumption | 1 mA to >4A (in the PAGD regime) |
| Peak reactor current | 1 mA to >250 A |
| Current density (cathode area) | 0.05 to 5,000 A/m$^2$ |
| Current density (emission site) as a function of input power | $10^5$ to $5 * 10^7$ A/m$^2$ |
| PAGD rate | 0.01 to >50,000 PPS |
| Duty cycle | 1 to >40% |
| Pulse Time | 0.1 msec to 100 msec |
| Input energy per pulse | $10^{-3}$ to >$2 * 10^2$J |
| Reaction energy per pulse (@ reactor) | <1 to >$5 * 10^2$J |
| ReactorDynamic Capacitance | 100 μF to >80 mF |

We claim:

1. A pulse generator comprising a cold cathode vacuum discharge tube having an anode and a cathode enclosed within an evacuated housing, wherein the cathode has an extended surface facing the anode and the cathode is capable of auto-electronic emissions under abnormal glow discharge conditions, which emissions have an extinction potential substantially higher than the sustaining potential of a vacuum arc discharge in the same tube, said discharge tube being connected in an external circuit comprising a continuous direct current source connected between the anode and the cathode, the external circuit being capable of delivering a potential sufficient to initiate auto-electronic emissions, and sufficient current at sufficient potential to drive said tube into a negative resistance region of abnormal glow discharge, the external circuit having an impedance sufficient that, as the tube is driven into said negative resistance region, potential between the anode and the cathode collapses below said extinction potential before a vacuum arc is established, whereby an endogenous cyclical pulsed abnormal glow discharge (PAGD) will occur, the cathode being of sufficiently robust construction to enable it to withstand sustained PAGD and erosion resulting therefrom without disruption or substantial thermionic emission, the surface of the cathode facing the anode being of a metal and having an area which promotes auto-electronic emission at much lower currents than predicted by the Fowler-Nordheim field emission theory, and the minimum separation of the cathode from the anode being at least about 2 cm.

2. A pulse generator according to claim 1, wherein the housing has an axis, and the tube further comprises:

a substantially pure tungsten probe disposed along the axis within the housing, the probe extending through a hermetic seal in a wall of the housing;

first and second electrodes disposed within the housing on opposite sides of the probe, the electrodes being suspended in parallel relationship and spaced apart by a minimum distance of 2 cm;

each electrode being respectively connected to an electrical lead which passes through a hermetic seal in a wall of the housing, at least one of said electrodes forming a cathode, and either the probe or the other electrode forming an anode.

3. A pulse generator according to claim 1, wherein the housing has an axis, and retains a residual gas atmosphere; and the tube further comprises:

a probe disposed along the axis within the housing;

first and second electrodes disposed within the housing on opposite sides of the probe, the electrodes being in parallel relationship and separated by a distance of at least 3 cm;

electrically conductive means for respectively connecting the electrodes exterior to the housing to form the anode and the cathode;

and means for making an electrical connection with the probe from outside the housing.

4. A pulse generator as claimed in claim 3, wherein the probe comprises a first and second probe element arranged in a coaxial spaced-apart relationship, the first and second probe elements being spaced apart at least 2 cm.

5. A pulse generator as claimed in claim 1, wherein at least the cathode is a plate having an extended surface area facing the anode, and of at least about 0.5 mm thickness.

6. A pulse generator as claimed in claim 1, wherein the cathode is formed from aluminum or its alloys, tungsten, nickel and its alloys, zinc, iron or silver.

7. A pulse generator as claimed in claim 1, wherein both the anode and cathode are symmetrical and formed from the same metal.

8. A pulse generator as claimed in claim 1, wherein the anode is formed from tungsten.

9. A pulse generator as claimed in claim 1, wherein the tube is evacuated to at least 10 Torr.

10. A pulse generator as claimed in claim 1, wherein the tube is evacuated to at least 1 Torr.

11. A pulse generator as claimed in claim 1, wherein the housing encloses a residual gas atmosphere selected from argon, krypton, helium, neon, an inert gas mixture, air, oxygen, hydrogen and nitrogen.

12. A pulse generator as claimed in claim 1, wherein the tube has multiple cathodes.

13. A pulse generator as claimed in claim 12, wherein the cathodes are arranged symmetrically relative to a common anode.

14. A pulse generator as claimed in claim 1, wherein the cathode has an area of at least 64 sq. cm.

15. A pulse generator as claimed in claim 1, wherein the surface of the cathode facing the anode is a curved surface coaxial with the anode, which is rod-like.

16. A pulse generator as claimed in claim 1, wherein the cathode is planar.

17. A pulse generator as claimed in claim 1, wherein the tube has an anode to cathode spacing of at least 3.5 cm.

18. A method of operating a cold cathode vacuum discharge tube in a pulse generator, the tube having a metallic cathode with extended surface area facing an anode and spaced therefrom sufficiently to allow a plasma eruption from the cathode associated with an abnormal glow discharge to occur without reaching the anode to form a continuous vacuum arc discharge channel, the area and metal of the cathode being selected to promote low field emission at much lower current densities than predicted by the Fowler-Nordheim vacuum arc discharge region law, while withstanding repeated abnormal glow discharges without substantial thermionic emission, connecting a circuit including a continuous direct current source between the anode and the cathode, the source having an open circuit potential and initial current capacity sufficient to initiate an abnormal glow discharge from the cathode and drive the discharge tube into a negative resistance region of abnormal glow discharge, and an impedance sufficient to ensure that the potential across the tube falls below that necessary to sustain the abnormal glow discharge before a vacuum arc discharge can be established.

* * * * *